US012581181B2

(12) United States Patent
Tremblay et al.

(10) Patent No.: US 12,581,181 B2
(45) Date of Patent: Mar. 17, 2026

(54) CASED GOODS INSPECTION AND METHOD THEREFOR

(71) Applicant: Symbotic Canada, ULC, Lafontaine (CA)

(72) Inventors: Simon Tremblay, Lafontaine (CA); Christian Simon, Laval (CA)

(73) Assignee: Symbotic Canada, ULC (CA)

( * ) Notice: Subject to any disclaimer, the term of this patent is extended or adjusted under 35 U.S.C. 154(b) by 0 days.

(21) Appl. No.: 18/398,326

(22) Filed: Dec. 28, 2023

(65) Prior Publication Data

US 2024/0223880 A1 Jul. 4, 2024

Related U.S. Application Data

(60) Provisional application No. 63/479,263, filed on Jan. 10, 2023, provisional application No. 63/477,858, filed on Dec. 30, 2022.

(51) Int. Cl.
*H04N 23/60* (2023.01)
*G06V 20/60* (2022.01)
*H04N 7/18* (2006.01)
*H04N 23/56* (2023.01)
*H04N 23/90* (2023.01)

(52) U.S. Cl.
CPC ............ *H04N 23/60* (2023.01); *G06V 20/60* (2022.01); *H04N 7/188* (2013.01); *H04N 23/56* (2023.01); *H04N 23/90* (2023.01)

(58) Field of Classification Search
None
See application file for complete search history.

(56) References Cited

U.S. PATENT DOCUMENTS

| | | |
|---|---|---|
| 10,929,625 B2 | 2/2021 | Graindourze |
| 10,964,007 B2 | 3/2021 | Ducharme et al. |
| 2013/0210563 A1* | 8/2013 | Hollinger ........... A63B 37/0003 473/570 |
| 2017/0213334 A1* | 7/2017 | Ducharme ................ G06T 7/70 |
| 2017/0345141 A1* | 11/2017 | Vivet ................. G01N 35/1016 |
| 2020/0064585 A1 | 2/2020 | Schneider et al. |
| 2021/0152735 A1* | 5/2021 | Zhou ...................... H04N 23/64 |

OTHER PUBLICATIONS

International Search Report for application No. PCT/CA2023/051773 dated Mar. 4, 2024.

* cited by examiner

*Primary Examiner* — Eileen M Adams
(74) *Attorney, Agent, or Firm* — Perman & Green, LLP

(57) ABSTRACT

A logistics imaging module, for reading logistic iconography on containers of goods of different sizes, including a frame, a conveyor coupled to the frame to transport each container through the frame at a predetermined continuous throughput rate, at least one source of illumination connected to the frame and configured to illuminate the container with diffuse light, at least one camera, with a fixed depth of field, disposed to image the container transported substantially coincident with the illumination of the container. A controller is connected to the conveyor to determine a pose of the container transported relative to the frame. The controller is configured to trigger the at least one camera and the at least one source of illumination to image the container based on the determined pose being an optimum pose for imaging parameters of the at least one camera.

26 Claims, 13 Drawing Sheets

LOAD CASED GOODS ON CONVEYOR — 1000

OBTAIN CASED GOODS DATA — 1010

MATCH CASED GOODS DATA WITH RESPECTIVE CASED GOODS — 1020

DETERMINE OPTIMAL CAPTURE POSITIONS — 1030

IMAGE CASED GOODS — 1040

PROCESS IMAGE — 1050

PROCESS CASED GOODS — 1060

CASED GOODS INSPECTION AND METHOD THEREFOR

CROSS-REFERENCE TO RELATED APPLICATIONS

This application is a non-provisional of and claims the benefit of U.S. provisional patent application No. 63/477,858, filed on Dec. 30, 2022, and U.S. provisional patent application No. 63/479,263, filed on Jan. 10, 2023, the disclosures of which are incorporated herein by the reference in their entireties.

BACKGROUND

1. Field

The present disclosure generally relates to product inspection, and more particularly, to cased goods inspection systems and methods therefor.

2. Brief Description of Related Developments

There is a need to improve cased goods inspection systems and methods. For example, generally bar code readers require high definition imaging (e.g., about 10 MP or greater) with magnification. Some barcode reading stations for logistics facilities employ cameras, mounted at fixed locations, having a deep depth of field and white light to illuminate the barcode on a side of a product package or cased goods. The deep depth of field is, for example, about 3700 mm (about 145 inches) or deeper. However, with the deep depth of field cameras, the white light illumination of the barcode may cause chromatic aberration (also called chromatic distortion and spherochromatism) lens failure. As such, white light illumination of the barcode is deleterious to bar code reading with deep depth of field cameras.

Other bar code readers for logistics facilities employ cameras with liquid lenses and shallower depths of field than those noted above. These readers employ red, white, blue, infrared, or ultraviolet illumination of the bar codes and position large numbers of cameras (e.g., 21 cameras) at fixed locations of the barcode reading station to enable scanning all six sides of a product package or cased goods. Here, the number of cameras increases the complexity and cost of the bar code scanning station.

It would be advantageous to have a barcode reading station that remedies at least the above-noted deficiencies and decouples barcode scanning from deep depth of field and autofocusing cameras. It would also be advantageous to read barcodes coincident (e.g., substantially simultaneously) with reading of hazardous material iconography disposed on the same case of goods.

BRIEF DESCRIPTION OF THE DRAWINGS

The foregoing aspects and other features of the present disclosure are explained in the following description, taken in connection with the accompanying drawings, wherein.

DETAILED DESCRIPTION

Figure 1:
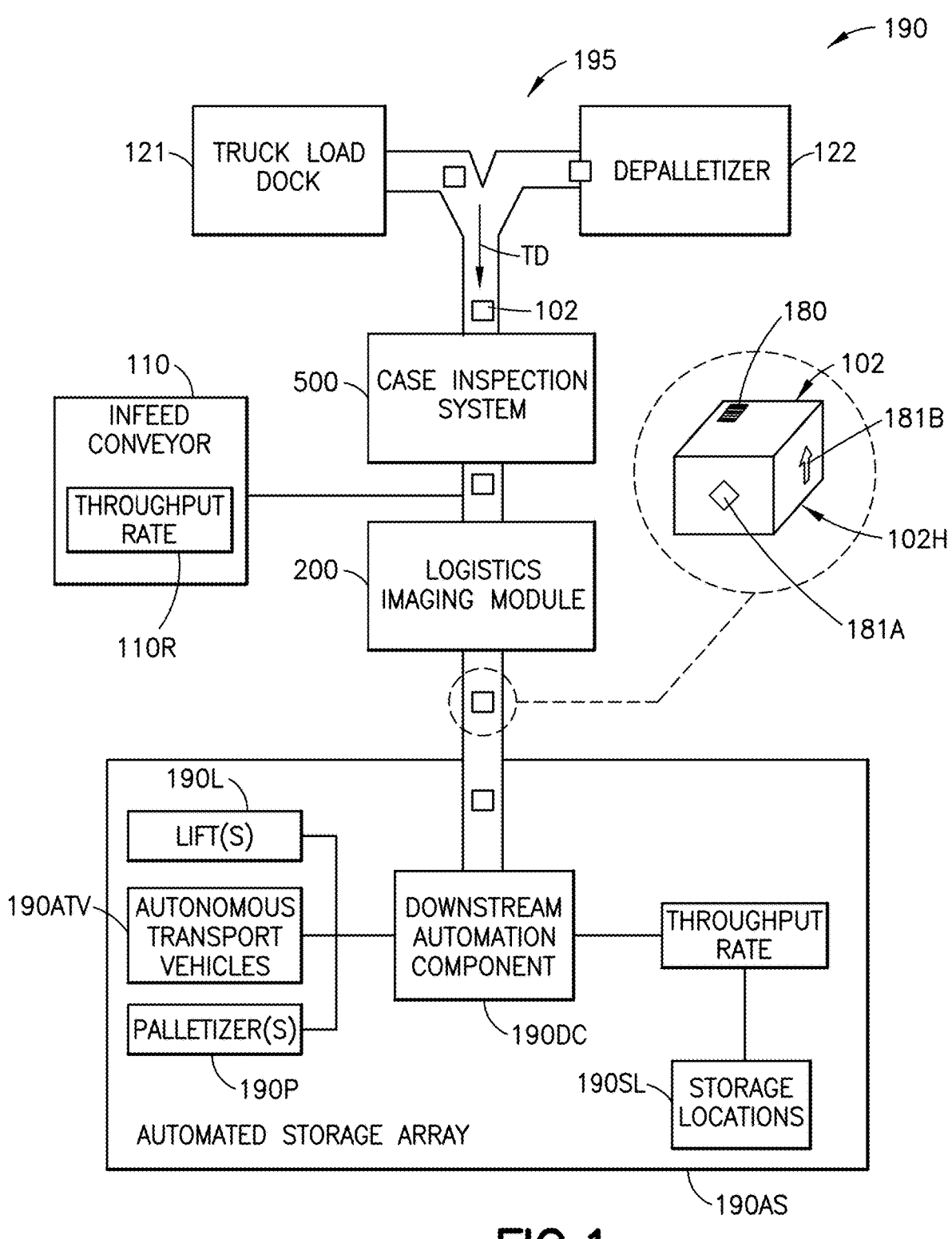
FIG. 1 is a schematic illustration of a logistics facility incorporating a logistics imaging module in accordance with aspects of the present disclosure.
Figure 2:
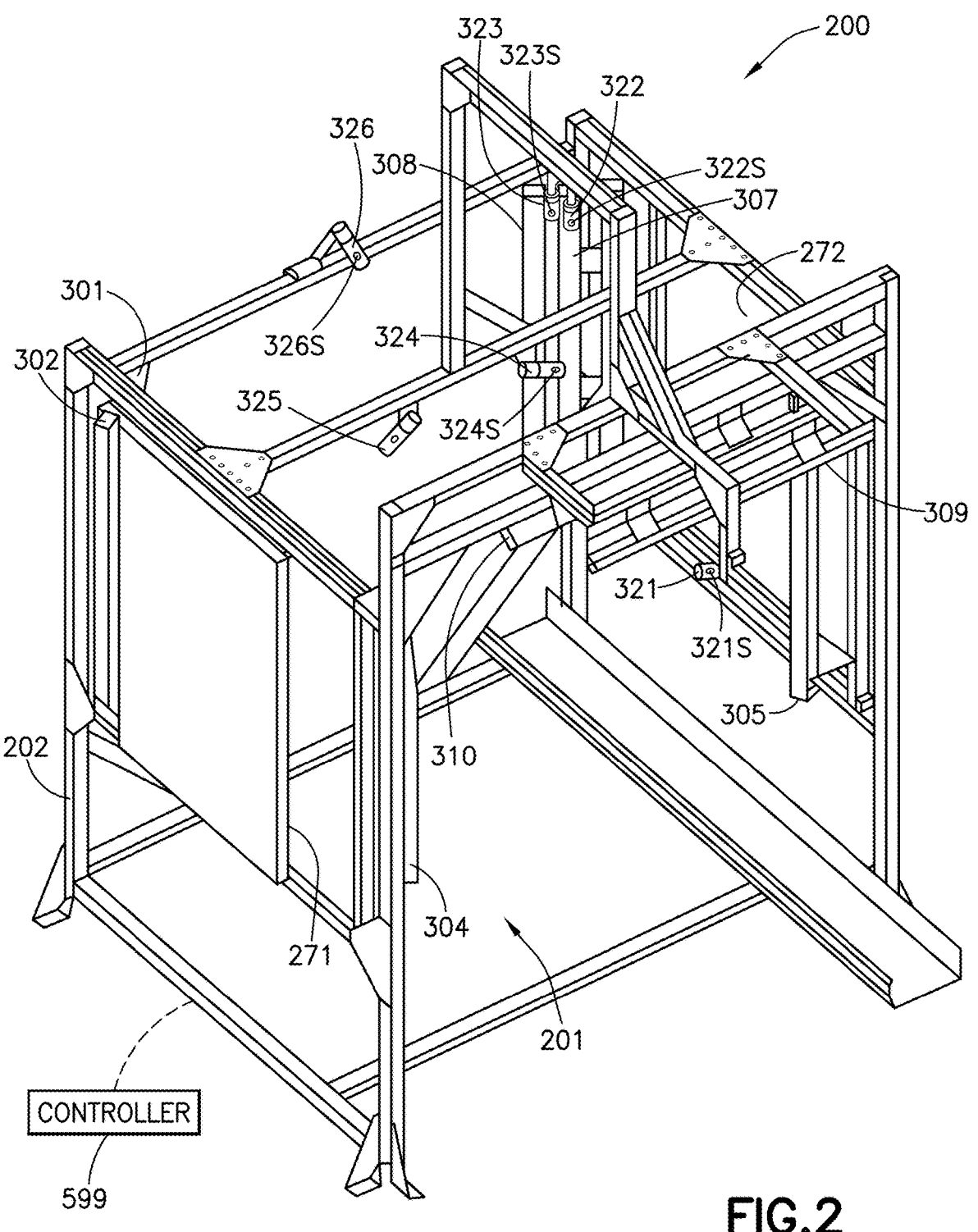
FIG. 2 is a schematic perspective illustration of a portion of the logistics imaging module of FIG. 1 in accordance with aspects of the present disclosure.

FIG. 1 illustrates an exemplary logistics facility 190 incorporating a logistics imaging module 200 (also referred to herein as a logistics iconography reading module) in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

In accordance with aspects of the present disclosure, the logistics imaging module 200 is configured to read both barcode symbologies or iconography 180 (also referred to herein as barcodes 180) and hazardous material (hazmat) symbologies or iconography (inclusive of hazard graphic symbols 181A and product orientation (e.g., up direction arrow) symbologies or iconography 181B—also referred to herein as hazmat iconography 181A and product orientation iconography 181B) in a common (e.g., single) tunnel 201 through which cased goods 102 (also referred to herein as containers) pass, inbound to the logistics facility 190. Exemplary bar codes 180 include, but are not limited to, UPC, Code 39, Code 128, ITF-14, Interleaved 2 of 5, Data Matrix, QR, MaxiCode, and Aztec. Exemplary hazmat and package orientation iconography 181A, 181B include, but are not limited to, those in compliance with United States Code of Federal Regulations, Title 49, Parts 100-185 and similar hazardous material regulations of other countries.

The logistics imaging module 200 is configured to commonly read the barcodes 180, hazmat iconography 181A, and product orientation iconography 181B regardless of cased goods 102 orientation through the tunnel 201 (e.g., iconography reading is decoupled from cased goods orientation). Here, the cased goods 102 travel through the tunnel 201 on at least one infeed conveyor 110 where the logistics imaging module 200 is configured to image all six sides of the hexahedron shaped cased goods 102 (in other aspects the cased goods may have any suitable shape) such that the iconography on about 97% (or more) of the cased goods 102 passed through the logistics imaging module 200 are successfully read for a variety of case sizes. The variance in case sizes (e.g., length, width, and height) having a substantially stochastic distribution with the smallest cased good having a size of about 6.4 inches by 5 inches by 2 inches and the largest cased good having a size of about 36 inches by 24 inches by 28 inches (although in other aspects the cased goods may be larger or smaller than the aforementioned exemplary sizes).

Figure 3:
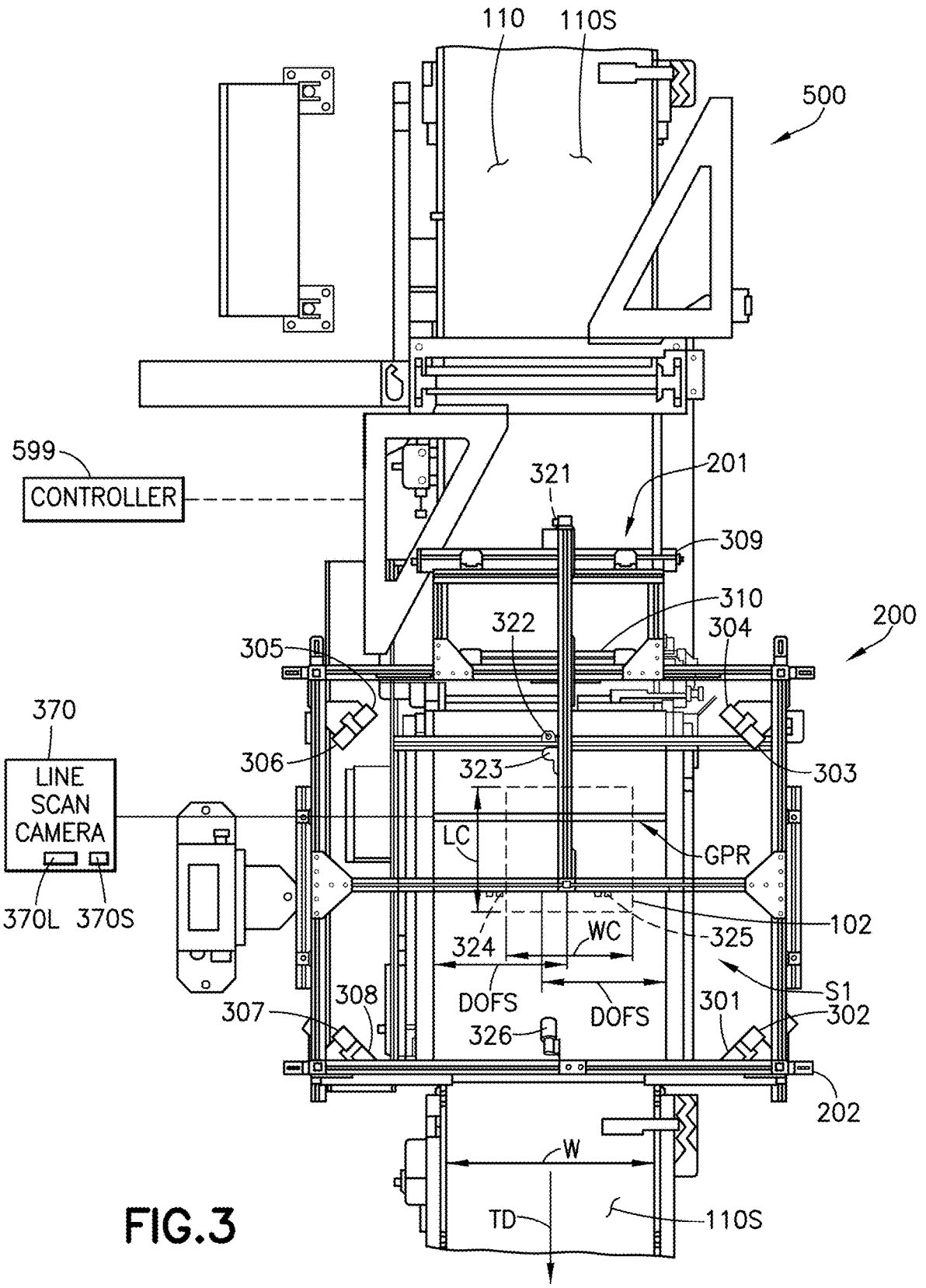
FIG. 3 is a schematic plan view of a portion of the logistics facility illustrating the logistics imaging module in communication with a case inspection station in accordance with aspects of the present disclosure.

In accordance with the aspects of the present disclosure, the logistics imaging module 200 decouples iconography reading from deep depth of field cameras and autofocusing lenses. As described herein, the logistics imaging module 200 illuminates the cased goods 102 with one or more of white light and monochromatic light, and employs (with reference to FIG. 3) two side cameras 324, 325 (positioned to have an imaging direction transverse to a travel direction TD of the infeed conveyor 110), a front camera 326 and rear camera 321 (each positioned to have an imaging direction parallel with the travel direction TD of the infeed conveyor 110), two top cameras (each positioned to have an imaging direction transverse to a travel direction TD of the infeed conveyor 110), and a line scan camera 370 (e.g., positioned underneath the infeed conveyor 110 and having an imaging direction transverse to a travel direction TD of the infeed conveyor 110. Each of the cameras 321-326 have a fixed focal length with a fixed shallow depth of field of about 14 inches (about 355 mm), although in other aspects the shallow depth of field may be greater or less than about 14 inches (the line scan camera may have any suitable fixed focal length and fixed depth of field for imaging the bottom of cased goods travelling on the conveyor 110 in the manner described herein). The two top cameras 322, 323 have a combined shallow depth of field of about 28 inches (about 660 mm—each of the top cameras having only a portion of the 28 inch depth of field where the focal point of one top camera is above the focal point of the other top camera and each cameras has the about 14 inch depth of field), although in other aspects the collective shallow depth of field (with or without overlap between the depths of field of the top cameras) may be greater or less than about 28 inches. As described herein, the logistics imaging module 200 leverages case pose information and case identification information obtained by case inspection system 500 or other suitable perception sensing device (e.g., including but not limited to simple single three-dimensional camera, two-dimensional camera, raster scan laser, etc.) for triggering respective ones of the six cameras for capturing the iconography of the cased good 102 and for rectifying (e.g., true up—make aligned with or orthogonal/normal with/to a reference frame) the image perspective to being normal with respect to the reference frame of the imaging camera (e.g., substantially without chromatic aberration and rectification of the image to being normal with respect to the reference frame of the imaging camera is substantially deterministic of the imaged iconography).

Still referring to FIG. 1, the logistics facility includes an infeed portion and an order fulfillment portion. The infeed portion includes one or more of a truck load dock 121 and a depalletizer 122. The truck load dock 121 provides for removal of cased goods 102 from a truck (or other conveyance) substantially directly to the inbound conveyor system 195. The depalletizer 122 provides for automated removal of cased goods 102 from a pallet to the inbound conveyor system 195. The inbound conveyor system 195 includes at least one infeed conveyor 110 that transport the cased goods 102 to an automated storage array 190AS.

The infeed portion also includes the case inspection system 500 and the logistics imaging module 200, where the infeed conveyor 110 transports cased goods 102 through each of the case inspection system 500 and the logistics imaging module 200. Cased goods information obtained by the case inspection system 500 and the logistics imaging module 200 are employed for induction of cased goods into the automated storage array 190AS. Here, downstream automation component(s) 190DC of the automated storage array 190AS receive the cased goods 102 from the infeed conveyor 110 and transport the cased goods to storage locations 190SL. Examples of the downstream automation component(s) 190DC include lifts 190L (for transporting cased goods to and from stacked levels of the automated storage array) and autonomous transport vehicles 190ATV (for transporting cased goods on a respective storage level to and from the storage locations 190SL). As may be realized, ordered cased goods are transported from the storage locations 190SL to palletizer(s) 190P (or other packing stations, which are further examples of downstream automated components 190DC) for shipping from the logistics facility 190. Suitable examples of automated storage and retrieval system having storage arrays in which the aspects of the present disclosure may be employed can be found in, but are not limited to, those storage and retrieval systems described in U.S. Pat. No. 10,800,606 issued on Oct. 13, 2020 (titled "Material-Handling System Using Autonomous Transfer and Transport Vehicles"), U.S. Pat. No. 10,556,743 issued on Feb. 11, 2020 (titled "Storage and Retrieval System"), U.S. Pat. No. 10,633,184 issued on Apr. 28, 2020 (titled "Replenishment and Order Fulfillment System"), U.S. Pat. No. 9,475,649 issued on Oct. 25, 2016 (titled "Pickface Builder for Storage and Retrieval Systems"), U.S. Pat. No. 10,106,322 issued on Oct. 23, 2018 (titled "Bot Payload Alignment and Sensing"), U.S. Pat. No. 10,703,585 issued on Jul. 7, 2020 (titled Pallet Building System"), and U.S. Pat. No. 10,781,060 issued on Sep. 22, 2020 (titled "Storage and Retrieval System Transport Vehicle"), the disclosures of which are incorporated herein by reference in their entireties.

Referring also to FIGS. 5 and 5A-5C, the cased goods inspection system or apparatus 500 includes a portion of the at least one infeed conveyor 110, a vision system 550, a controller 599, and a user interface 598. Suitable examples of cased goods inspection systems that may be employed with the aspects of the disclosed embodiment can be found in U.S. patent application Ser. No. 17/648,171 filed on Jan. 17, 2022 and titled "Cased Goods Inspection and Method Therefor," and U.S. patent Ser. No. 11/449,978 issued on Sep. 20, 2022 and titled "Cased Goods Inspection System and Method," the disclosures of which are incorporated herein by reference in their entireties. The cased goods inspection system 500 determines at least cased goods pose and cased goods identification information that is employed by the logistics imaging module 200 for imaging iconography on the cased goods 102 as described herein.

The cased goods inspection system 500 forms, at least in part, or is otherwise included in the inbound conveyor system 195 for induction of cased goods 102 into the logistics facility 190. For exemplary purposes only, the cased goods inspection system 500 is in communication with the at least one infeed conveyor 110 and receives the cased goods 102 which arrive individually on infeed conveyor 110 in any orientation and position, where the cased goods 102 are transferred through the cased goods inspection system 500, by the infeed conveyor 110, to the logistics imaging module 200. The output of the cased goods inspection system 500 includes various (quantitative) measurements that characterize each cased goods, for example a case of goods. Examples of quantitative measurements include: "real box", "max box", "max bulge", "orientation angle", "distance from one side of the conveyor", open flaps, concavity (e.g., inward bulge), etc.

"Real box" measurements include dimensions of the best-fit shape that can be determined based on, or obtained from, the combined cased good image. For example, the shape employed in the fit is a box having a length, width and height. Alternatively, the shape employed can be a sphere having a center and a radius. Various other shapes can be employed in the fit, such as but not limited to a cylinder, ovaloid, cone, etc.

"Outside box" measurements include dimensions of the smallest shape that contains the entire product that can be determined based on, or obtained from, the combined product image (as may include protrusions seen by the vision system including distressed product portion, labels and wrapping). For example, the shape employed in the fit is a box having a length, width and height indicative of the largest rectangular footprint of the cased goods 102 on the infeed conveyor 110. Alternatively, the shape employed can be a sphere having a center and a radius. Various other shapes can be employed in the fit, such as but not limited to a cylinder, ovaloid, cone, etc.

The "max bulge" measurement is the longest dimension obtained from the cased goods 102 being inspected. With the orientation of the product determined, the "max bulge" is the biggest caliper measure in width, in length, and in height.

The product "orientation angle" is the angle of the product's main axis relative to the travel direction TD of cased goods 102 on the infeed conveyor 110. For exemplary purposes, the "orientation angle" measurement can be a major axis when an ovaloid shape is employed in the fits.

A "distance from one side of the conveyor" is determined as the minimum distance obtained between the cased goods 102 and either of the predetermined conveyor sides.

The at least one infeed conveyor 110 is configured to advance the cased goods 102 past the cased goods inspection system 500. For example, the at least one infeed conveyor 110 is one or more of a conveyor belt (e.g., mat top high-grip conveyor), roller conveyor, or any other suitable product conveyance configured to transport incoming cased goods 102 from any suitable equipment (e.g., automated or otherwise) or warehouse worker (e.g., human). The at least one infeed conveyor 110 is configured to move cased goods 102 into and through the vision system 550 with minimized vibration and slippage (e.g., the vibration and slippage are below any suitable predetermined thresholds for vibration and slippage which may depend on the resolution of the vision system 550 components).

Referring to FIGS. 5 and 5A-5C, the vision system 550 is positioned (e.g. mounted), at least in part, around and about the infeed conveyor 110 for viewing and measuring characteristics of the cased goods 102 (noted above) advanced with the infeed conveyor(s) 110 past the cased goods inspection system 500. As described herein, the vision system 550 includes at least one camera (such as for example, at least one sensor/imaging device 571-573) arranged to capture case image data of each of the cased goods 102 advanced with the at least one infeed conveyor 110 past the cased goods inspection system 500.

In accordance with the aspects of the present disclosure the vision system 550 includes at least a flap detection system 570 that includes at least one sensor/imaging device 571-573 (referred to herein as sensors 571-573) for detecting open flaps (or otherwise effecting a detection of an open flap), bulges, and/or concavities of the cased goods 102. The sensors are any suitable sensors configured to detect/sense at least flaps, bulges, and/or concavities of the cased goods 102 and include but are not limited to cameras (three are illustrated for exemplary purposes only and it should be understood that there may be more or less than three cameras), laser detection systems, or any other suitable optical or sonic detection system for detecting the flaps of the cased goods 102. The sensors 571-573 may be any suitable cameras such as for example, three-dimensional cameras including but not limited to time-of-flight cameras or any other suitable three-dimensional imaging camera. In one or more aspects of the present disclosure the sensors 571-573 are positioned adjacent the at least one conveyor 110 for detecting open flaps, bulges, and/or concavities of the cased goods 102. As can be seen in FIGS. 5A-5C, in one or more aspects of the present disclosure the flap detection system 570 includes lasers, where each sensor 571-572 (only two cameras are illustrated in FIGS. 1A-1C for exemplary purposes and it should be understood that more or less than two cameras may be provided) is paired with a laser 572L, 573L (noting that sensor 571 may also be paired with a laser 571L that is not illustrated in FIGS. 1A-1C for clarity). The lasers 571L 572L, 573L are configured to emit a sheet of illumination that provides a respective scan line on the cased goods 102 where the scan line illuminates a profile of the cased goods 102. The illumination of the profile with the scan line, in one or more aspects, facilitates (e.g., through image recognition of case image data from the sensors 572, 573) detection of open flaps, bulges and/or concavities of the cased goods 102. In still other aspects, one or more of the sensors 571-573 is/are paired with a respective laser while other sensor(s) 571-573 do not have an associated laser. In one or more aspects, the lasers 571L, 572L, 573L are substantially similar to light sources 582, 583 described herein.

The vision system 550 may further include another imaging system (e.g., a profile detection system 580, also referred to as a case inspection system or station) that is separate and distinct from the at least one sensor 571-573 of the flap detection system 570. The profile detection system 580 images the cased goods 102, separate and distinct from the at least one sensor 571-573 imaging of the cased goods 102, for inspection of the cased goods other than detection of the concavity condition. The profile detection system 580 may be substantially similar to that described in U.S. patent Ser. No. 10/964,007 issued on Mar. 30, 2021 (titled "Cased Goods Inspection System and Method"), the disclosure of which is incorporated herein by reference in its entirety.

The profile detection system 580 includes at least one sensor/imaging device 581, 584 positioned adjacent the at least one conveyor 110 and configured to detect/sense the top and side profiles of the products 102. The at least one sensor/imaging device 581, 584 of the profile defection system 580 is configured so as to capture an image of a shadow of each of the cased goods 102 advanced past the case inspection station 500. The at least one sensor(s) 581, 584 of the profile detection system 580 is/are separate and distinct from the flap detection system 570 and the profile detection system 580 images the cased goods 102, separate and distinct from the at least one sensor 571-573 of the flap detection system 570, for inspection of the cased goods 102 other than the detection of the open case flaps. Here, the profile detection system 580 images the cased goods 102 for controller 599/processor 599P validation of identity of each of the cased goods 102 (e.g., with a predetermined or expected identity of each of the cased goods) and conformity of each of the cased goods 102 with (e.g., predetermined or expected) case size parameters for the validated cased good 102.

In accordance with aspects of the present disclosure, the profile detection system 580 includes a first light source 582 which emits a first sheet of light, e.g. a continuous plane of substantially parallel/collimated light, within a small gap GP between portions of the at least one conveyor 110. For example first light source 582 can be located above the at least one conveyor 110 as otherwise shown in FIG. 5 or below the at least one conveyor 110. In one or more aspects, the first light source 582 may be common to (i.e., shared between) both the profile detection system 580 and the flap detection system 570 (e.g., the first light source may serve as one of the lasers 572L, 573L described above or vice versa).

The profile detection system 580 further includes a first camera system 584 located for example opposite first light source 582 with respect to at least one conveyor 110. The first camera system 584 is positioned to receive the parallel/collimated light emitted by first light source 582 through, for example, the gap GP. For example where the first light source 582 is located above the at least one conveyor 110, the first camera system 584 is located below the at least one conveyor 110. In other aspects, the orientation of first light source 582 and first camera system 584 may be rotated as desired about the axis defined by the direction of travel of at least one conveyor 110 maintaining the relationship between light source 582 (e.g., light emitter) and camera system 584 (e.g., light receiver).

A second light source 583 emits a second sheet of light, i.e. a continuous plane of substantially parallel/collimated light, over the small gap between conveyor portions. For example second light source 583 can be located on one side of the at least one conveyor 110 (transmission of the parallel/collimated light beams of the second sheet being substantially (orthogonal to the continuous plane of parallel/collimated light of the first sheet of light). In one or more aspects, the second light source 583 may be common to (i.e., shared between) both the profile detection system 580 and the flap detection system 570 (e.g., the second light source may serve as one of the lasers 572L, 573L described above or vice versa).

A second camera system 581 is correspondingly located (e.g. opposite the second light source 583) to receive illumination from the second light source 583 with respect to the at least one conveyor 110. The second camera system 581 is positioned to receive the parallel/collimated light emitted by second light source 583. For example, where second light source 583 is located to one side of the at least one conveyor 110, the second camera system 581 is located to the other opposite side of conveyors 110, 120.

In accordance with one or more aspects of the present disclosure, at least one light source 582 or 583 can include a light shaper LS made with lenses or mirrors that effects the collimated output beam. The light source is any suitable light source and can include, but is not limited to, one or more of a laser, a light emitting diode (LED), gas lamps, and any other device of electromagnetic radiation suitable for electromagnetic illumination of a target object and which reflection or transmission, of which may be captured by an appropriate imaging system generating an image or pseudo image of the illuminated target object.

The collimated output light beam(s) of the light source(s) 582, 583 provides the sheet(s) of parallel propagating light which, when impeded by the cased good 102, casts an orthographic projection shadow onto an input window of the corresponding camera system 584, 581 opposite the corresponding light source 582, 583. In this regard, the camera system 584, 581 receives an incident collimated input beam output by the corresponding light source. Alternately, the orthographic projection shadow may be formed differently, such as by illumination of goods with a diffuse (monochromatic) light source so as to cast the shadow on a suitable beam shaper, such as a Fresnel lens through which the camera system 584, 581 views the goods.

The at least one sensor/imaging device 571-573 of the flap detection system 570 is connected to the case inspection station 500, separate and distinct from the at least one camera 581, 584. The at least one sensor/imaging device 571-573 is arranged to capture other case image data of each of the cased goods 102, advanced past the case inspection station 500, than case image data captured by the at least one camera 581, 584. In the example illustrated in FIGS. 5 and 5A-5C, the flap detection system 570 leverages case image data or any other suitable data from the profile detection system 580. Here, the flap detection system 570 is located downstream, relative to the direction of product travel along the at least one conveyor 110, from the profile detection system 580 (e.g., the products 102 pass through the profile detection system 580 prior to passage through the flap detection system 570); however, in other aspects the flap detection system 570 may be located upstream from the profile detection system 580. The relative positioning of the flap detection system 570 and the profile detection system 580 is such that the flap detection system 570 images one or more exterior sides of the cased goods 102 (in one or more aspects all visible exterior sides not seated against, e.g., the one or more conveyor 110) substantially simultaneously with the profile detection system 580 imaging the cased goods 102.

Figure 5:
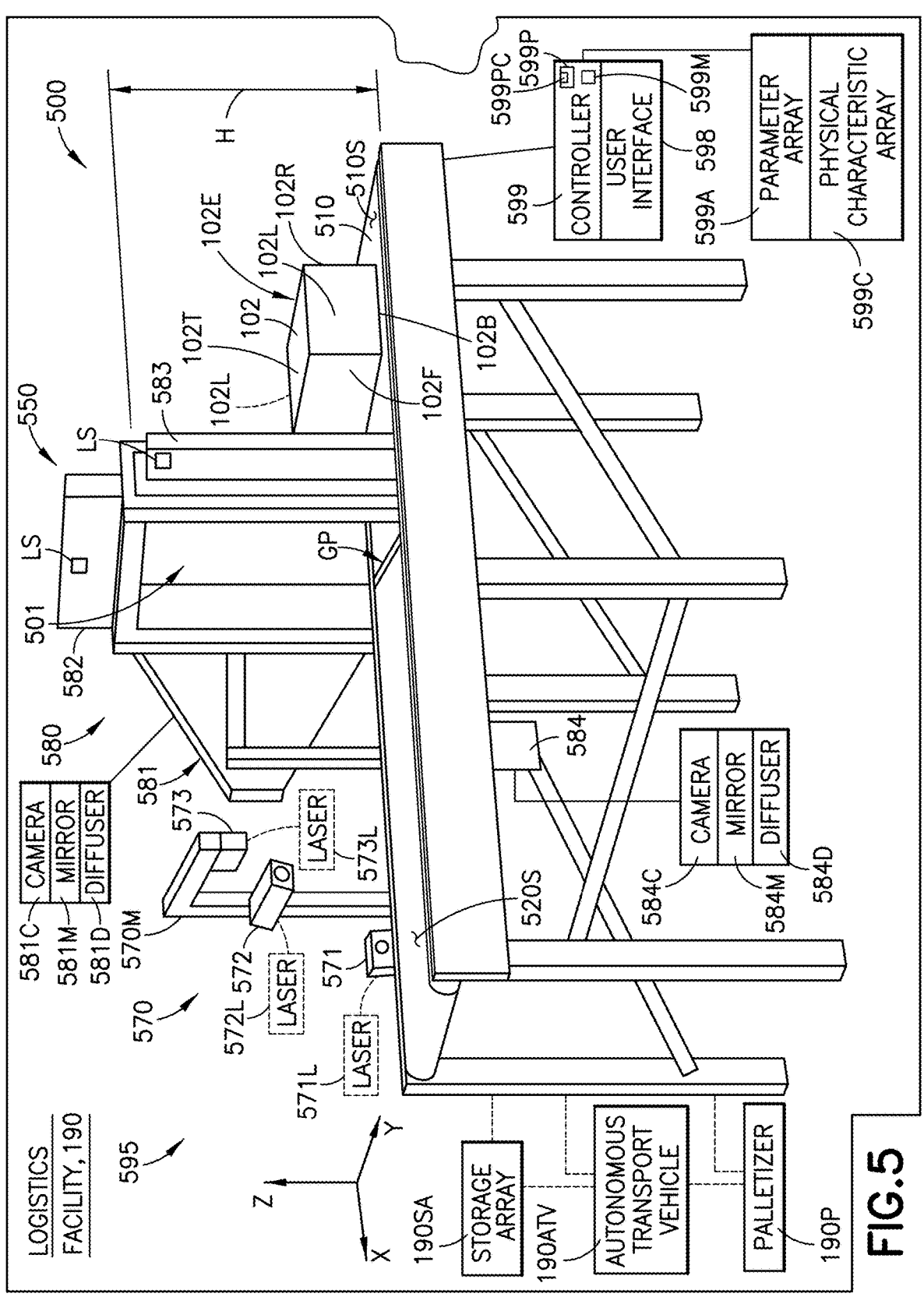
FIGS. 5, 5A, 5B, and 5C are schematic illustrations of the case inspection station of FIG. 1 in accordance with aspects of the present disclosure.
Figure 5A:
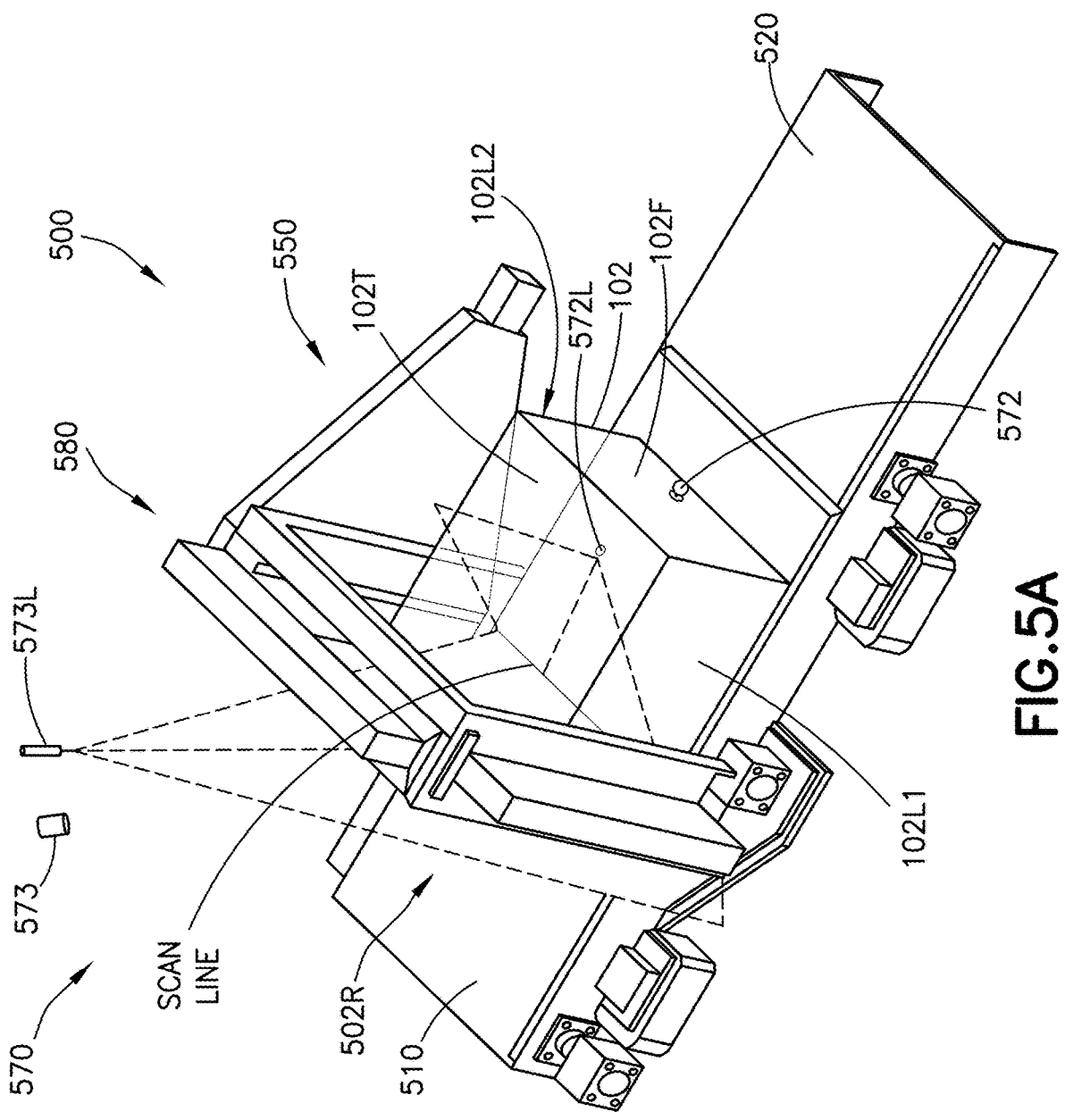
Figure 5B:
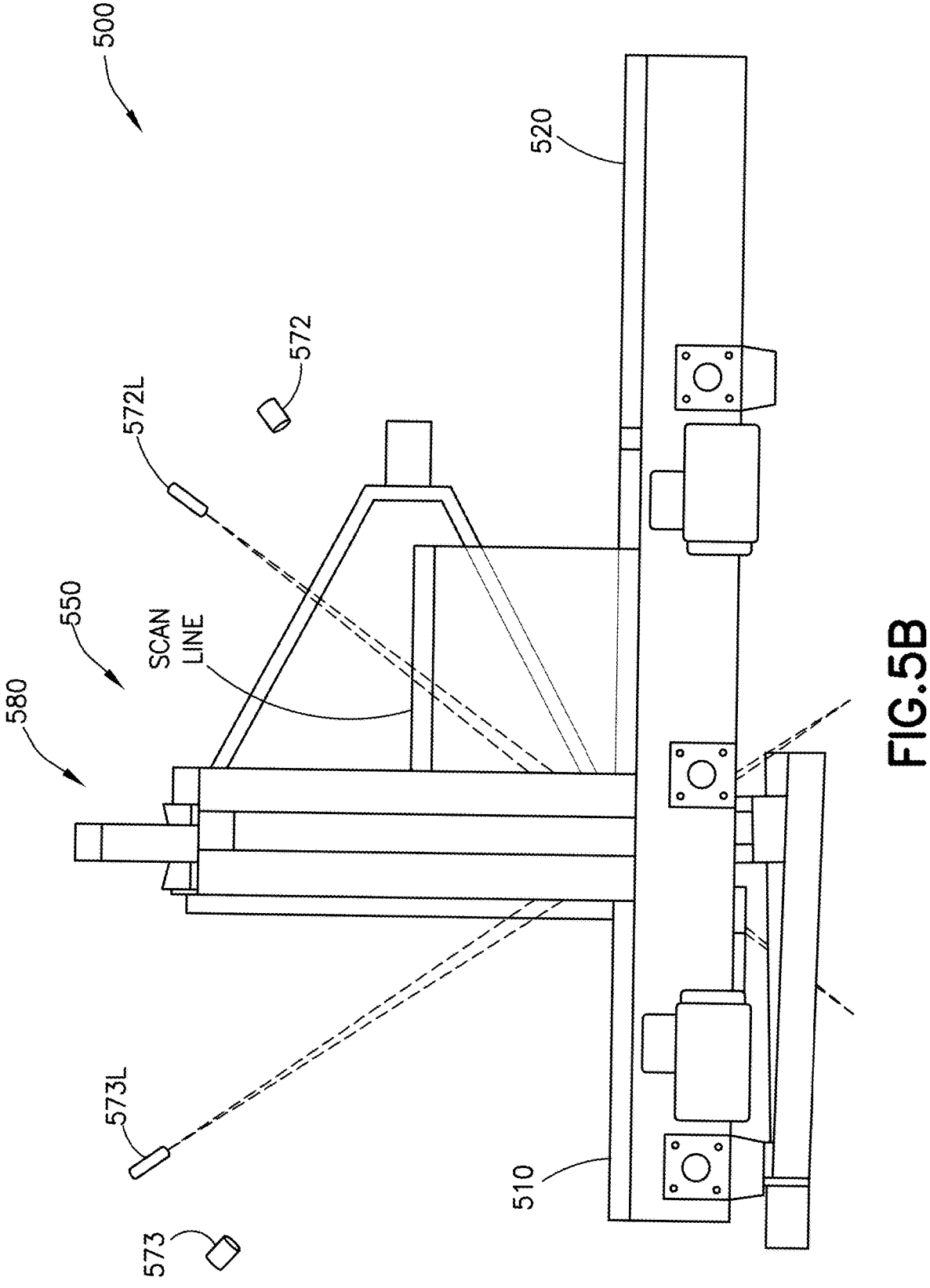
Figure 5C:
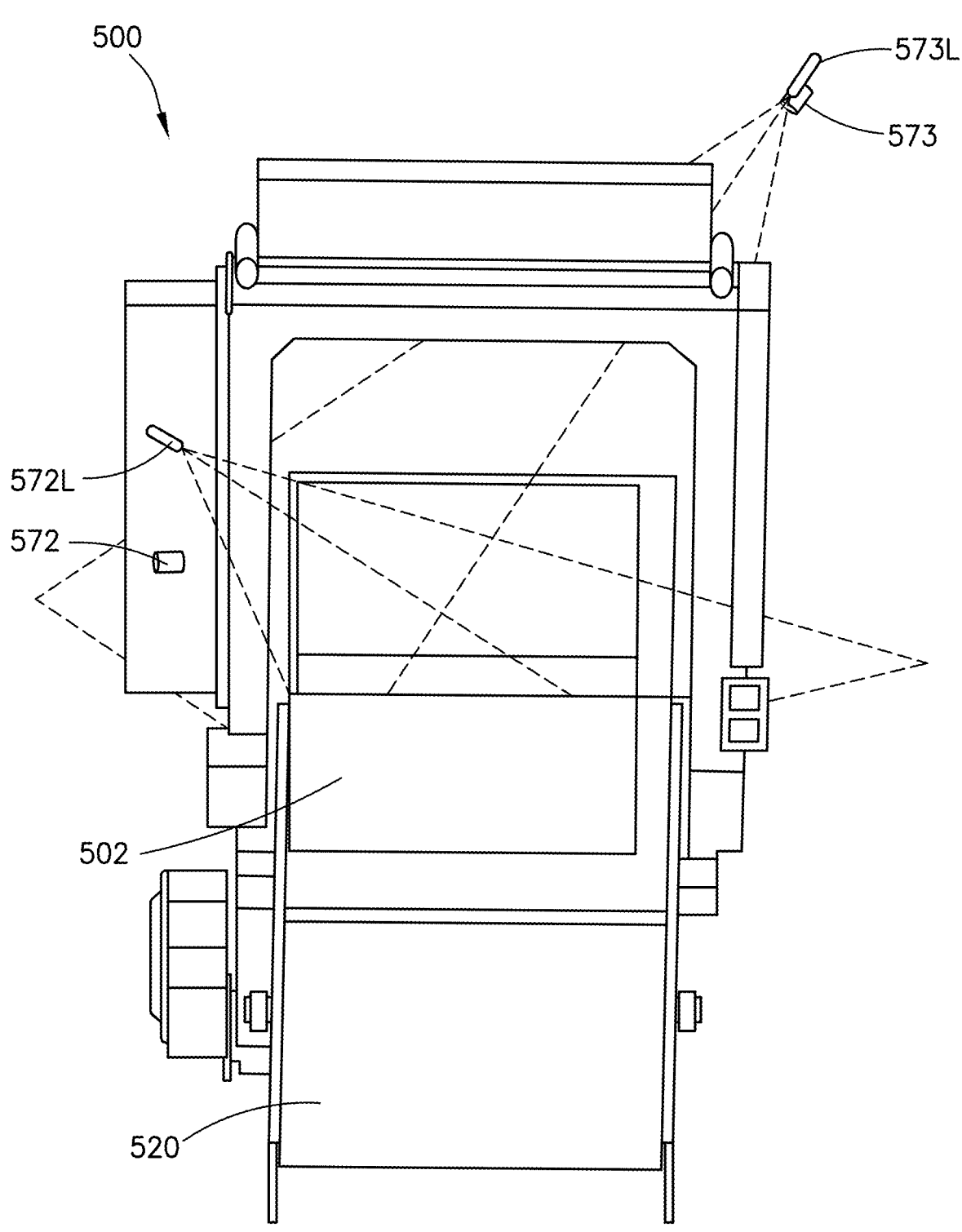
Figure 6:
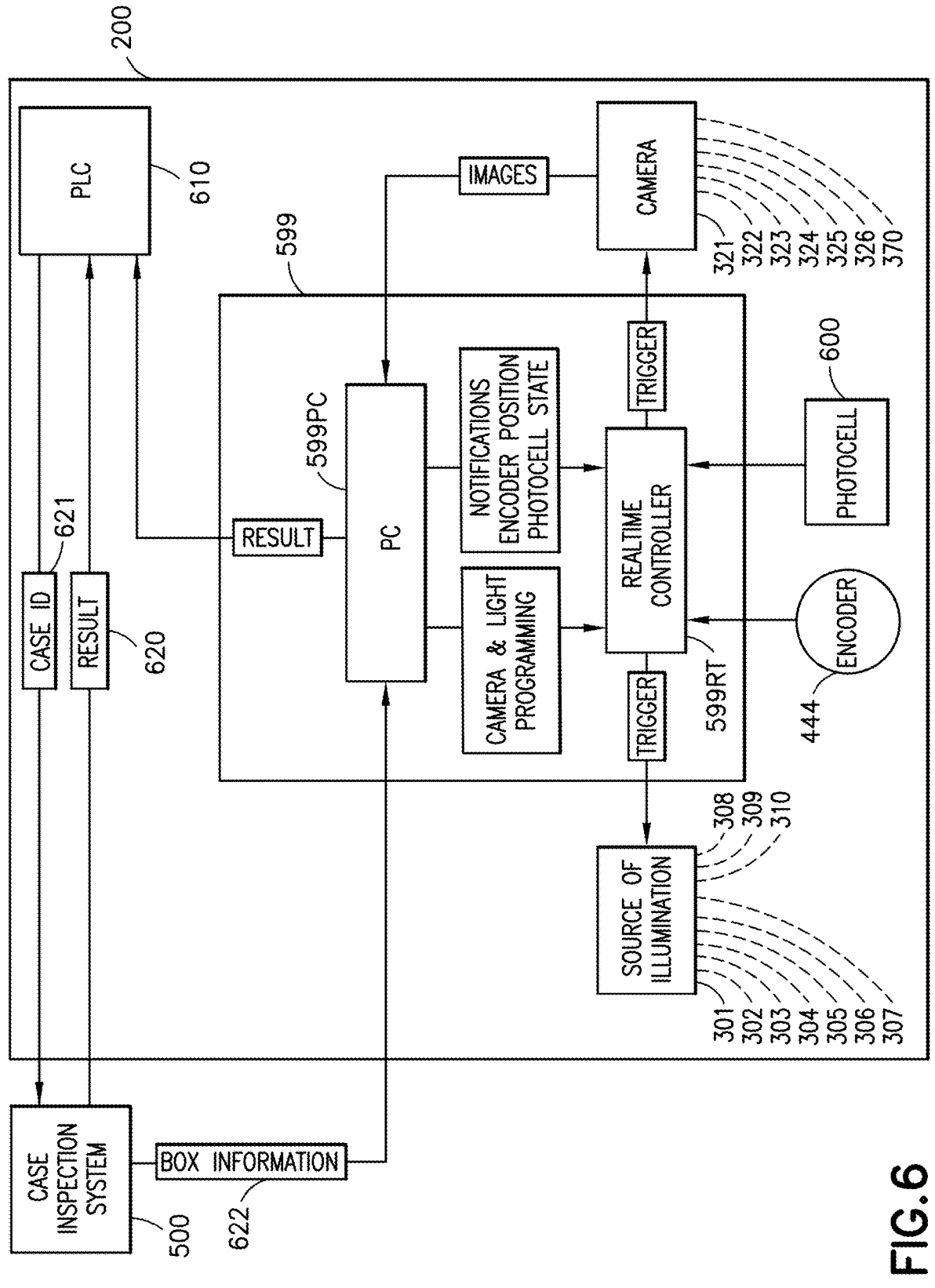
FIG. 6 is a high-level schematic illustration of a process flow of the logistics imaging module of FIG. 1 in accordance with aspects of the present disclosure.

Referring to FIG. 5, the flap detection system 570 includes one or more platforms, stanchions, or other suitable supports that are located adjacent to the at least one conveyor 110 and on which sensors/imaging devices 571-573 (and in one or more aspects lasers 571L-573L) are located. It is again noted that while three sensors 571-573 are illustrated in FIG. 5, in other aspects there may be more or fewer than three sensors (such as for example, two sensors illustrated in FIGS. 5A-5C) arranged for imaging all five visible exterior sides of a cased good 102 that is not seated against the at least one conveyor 110. The sensors/imaging devices 571-573 are arranged relative to the at least one conveyor 110 for imaging any suitable number of surfaces of each cased good 102 as the product passes through the flap detection system 570; however, in other aspects, a single sensor/imaging device with suitable prisms or mirrors can also provide the images of the suitable number of surfaces of each cased good 102.

In FIG. 5, the sensors 571-573 are arranged so that each sensor 571-573 images at least one or more respective exterior side of the cased good 102. For example, sensor 571 images a lateral side (and profiles of the longitudinal and top sides) of the cased good 102, sensor 573 images a top (and profiles of the lateral and longitudinal sides) of the cased good 102, and sensor 572 is angled so as to image a lateral side, a top side, and a longitudinal side of the cased good 102. In FIGS. 5A-5C the sensors 572, 573 are angled relative to each other and disposed on opposite sides of the at least one conveyor 110 so as to image both lateral sides, both longitudinal sides, and the top of the cased good 102 (e.g., two sensors image the five visible sides of the cased good 102). In some aspects of the present disclosure, the flap detection system is provided with any suitable lighting (e.g., such as the lasers/collimated light sources described above) that facilitates imaging of the cased goods 102 moving along the conveyor 110, 120. In one aspect, the exposure (e.g., ISO and/or shutter speed) of the sensor/imaging devices 571-573 is such that the cased good 102 moving along the at least one conveyor 110 appears to be stationary and a resulting image of the cased good 102 moving along the conveyor is not blurred, while in other aspects, a "stop motion effect" of the cased good 102 moving along the at least one conveyor 110 may be produced by any suitable strobe lighting.

As noted above, the sensors/imaging devices 571-573 are any suitable sensors/imaging devices such as for example, time-of-flight cameras or any other suitable imager capable of generating, for example, a three-dimensional depth map or point cloud of each cased good 102 travelling along the conveyor 110, 120. In FIG. 5, the sensor/imaging device 572 is positioned adjacent the at least one conveyor 110 to image at least the a leading side 102F of the cased goods 102 (e.g., a front or longitudinal side of each cased good 102 relative to the direction of travel along the at least one conveyor 110—noting that the term "front" is used here for exemplary purposes only and any spatial term may be used). For example, the sensor/imaging device 572 is mounted to stanchion 570M in any suitable manner so as to face in a direction substantially opposite the direction of travel along the at least one conveyor 110 so as to image cased goods 102 travelling towards the sensor/imaging device 572. The sensor/imaging device 573 is also mounted on stanchion 570M and is positioned above the at least one conveyor 110 so as to image a plan view of at least a top side 102T of the cased goods 102 travelling along the at least one conveyor 110 (e.g., the "top" side being relative to a side of the cased good 102 seated on the at least one conveyor 110—noting that the term "top" is used here for exemplary purposes only and any spatial term may be used). The sensor/imaging device 571 is mounted on any suitable surface adjacent the at least one conveyor 110 so as to image a lateral side 102L of the cased goods 102 travelling along the at least one conveyor 110. Referring to FIGS. 5A-5C, the sensor 572 is mounted (in a manner similar to that of FIG. 5) so as to be positioned relative to the at least one conveyor 110 for imaging a perspective view of the cased good 102 that includes one lateral side 102L1, the top side 102T, and a trailing or "back" longitudinal side 102R of the cased good 102. The sensor 573 is mounted (in a manner similar to that of FIG. 5) so as to be positioned relative to the at least one conveyor 110 for imaging a perspective view of the cased good 102 that includes the opposite lateral side 102L2, the top side 102T, and a leading or front longitudinal side 102F of the cased good 102. Each of the sensors/imaging devices 571-573 are positioned to produce an image of at least a respective side of the cased goods 102 and, as may be realized, the number of cameras may depend on the particular cased goods being inspected.

The at least one camera (e.g., sensor/imaging device 571-573) is arranged to image each exposed case side 102T, 102F, 102R, 102L1, 102L2 of each cased goods 102 advanced with the at least one conveyor 110 past the inspection apparatus 500 so as to image, from a common image of each imaged case side 102T, 102F, 102R, 102L1, 102L2, at least one of a case side concavity condition (or inward variance) and the case exterior protrusion apparent on each imaged case side 102T, 102F, 102R, 102L1, 102L2. The at least one sensor/imaging device 571-573 is arranged to capture the case image data of each of the cased goods 102 advanced with at least one conveyor 110 past the inspection apparatus 500, so that the case image data embodies at least one of a case side concavity and a case exterior protrusion with the at least one of the case side concavity and the case exterior protrusion apparent on at least one exposed case side 102F, 102R, 102T, 102L1, 102L2 and the at least one exposed case side 102F, 102R, 102T, 120L1, 102L2 is disposed in each exposed case side orientation of the cased goods 102.

In other aspects, the at least one sensor/imaging device 571-573 is arranged to capture the case image data of each of the cased goods 102 advanced with the at least one conveyor 110 past the inspection apparatus 500, so that the case image data embodies the concavity condition (or inward variance condition) with the concavity condition apparent on at least one exposed case side 102T, 102L, 102F, 102R (and in some aspects, as described herein, bottom 102B) and the at least one exposed case side is disposed in each exposed case side orientation of the cased goods 102. In addition to or in lieu of case exterior protrusion determination, the at least one exposed case side 102T, 102L, 102F, 102R imaged by the at least one sensor/imaging device 571-573 is disposed so that the concavity condition, resolved from the concavity condition apparent on the imaged at least one exposed case side 102T, 102L, 102R, 102F extends, from the at least one exposed case side 102T, 102L, 102R, 102F, adjacent a conveyor seat surface 110S on which the cased goods 102 is seated.

The cased goods inspection system 500 includes any suitable controller 599 (which includes any suitable processor 599P such that reference to the controller 599 performing or being configured to perform a task/function describe herein implies processor 599P operation) or any other device or system (local or remote) that includes a computer readable medium having non-transitory computer program code stored thereon that configures the controller 599 to register and analyze case image data from the vision system 550 to calculate desired measurements or other suitable characteristics (as described herein) of the cased goods 102. The controller 599 is operably coupled to the at least one conveyor 110 and communicably coupled to the at least one sensor 571-573, 581, 584 of the vision system 550 in any suitable manner, such as through any suitable wired or wireless connection so as to receive case image data from the at least one sensor 571-573.

It is noted that the controller 599 (e.g., through processor 599P) is configured so that cased goods inspection based on cased good images from the profile detection system 580 is/are resolved separate and distinct from resolving at least one of a case side concavity (also referred to as a case side concavity condition) and an open case flap from the case image data from the at least one sensor 571-573 of the flap detection system 570. The controller 599 is also configured so as to determine the presence of any case side concavity and any case exterior protrusions of the cased goods 102 from imaging data of the profile detection system 580 separate and distinct from the case image data captured by the at least one sensor 571-573 of the case detection system 570, and resolve at least one of the case side concavity and the case exterior protrusion 220 as being a respective case side concavity and an open case flap from the case image data of at least one sensor 571-573 of the flap detection system 570 separate and distinct from images of the profile detection system 580. In one or more aspects, the controller 599 is configured so as to determine a presence of at least one of the case side concavity and the case exterior protrusion from the case image data captured by the at least one sensor 571-573 of the flap detection system 570, independent of the images of the cased goods 102 captured by the profile detection system 580.

The controller 599 is, in one or more aspects, configured to characterize, from the case image data generated from a common image (e.g., of one of the at least one sensor 571-573 or a combined image from more than one of the at least one sensor 571-573) of the cased goods 102 captured by the at least one sensor 571-573, at least one of case side concavity 2300 and the case exterior protrusion of the cased goods 102 as a case flap in an open condition. Here, the at least one exposed case side 102F, 102R, 102T, 102L1, 102L2 imaged by the at least one sensor 571-573 is disposed so that the at least one of the case side concavity and the case flap in the open condition, resolved from the at least one of the case side concavity and the case exterior protrusion apparent on the imaged at least one exposed case side 102F, 102R, 102T, 102L1, 102L2 extends, from the at least one exposed case side 102F, 102R, 102T, 102L1, 102L2, adjacent a conveyor seat surface 110S (FIG. 1) on which the cased goods 102 is seated.

Where the processor is configured to characterize, from the case image data of the cased goods captured by the at least one sensor 571-573, of at least one case top 102T or at least one case side 102L, 102R, 102F with a concavity condition, the processor 599P is programmed to resolve, from the image data, an inward variance (or concavity) of the at least one case top 102T or the at least one case side 102L, 102R, 120F from predetermined planar coherence characteristics (e.g., such as from expected case dimensions and cased good type, e.g., stock keeping unit (SKU) as described herein) of the case top 102T or case side 102L, 102R, 102F. The processor 599P is configured to determine, from the image data, for each resolved inward variance presence a physical characteristic describing the concavity condition of the at least one case top 102T or the at least one case side 102L, 102R, 102F.

As described herein, the infeed conveyor 110 transports the cased goods 102 from the cased goods inspection system 500 to the logistics imaging module 200. Referring to FIGS. 1-4, the logistics imaging module 200 includes a frame 202, a conveyor (e.g., a portion of the infeed conveyor 110) coupled to the frame 202, at least one source of illumination 301-310, at least one camera 321-326, and a controller 599.

A portion of the infeed conveyor 110 forms a part logistics imaging module 200 and transports each cased goods through the frame 202 at a predetermined continuous throughput rate 110R. In one or more aspects, the predetermined continuous throughput rate 110R is commensurate with a predetermined input rate of the logistic facility 190 corresponding to a conveyor steady state speed of about 2 ft/sec (about 609 mm/sec) or any other suitable steady state speed greater than or less than about 2 ft/sec. In one or more aspects, the predetermined continuous throughput rate matches a throughput rate of at least another downstream automation component 190DC (see FIG. 1) loading cased goods 102 fed by the infeed conveyor 110 into or from the storage locations 190SL (see FIG. 1) of the automated storage array 190AS (see FIG. 1).

The at least one source of illumination 301-310 is connected to the frame and configured to illuminate the cased goods 102, transported through the frame 202, with diffuse light. In one or more aspects, the at least one source of illumination 301-310 is configured to flash illuminate the cased goods 102 with the diffuse light. The at least one source of illumination 301-310 is positioned on the frame so that substantially all sides (e.g., an entirety) of the cased goods 120 transported through the frame are illuminated. For example, one or more of the at least one source of illumination 301-308 are disposed at each vertical corner of the frame 202 so as to illuminate at least a front side 102F, a rear side 102R, and lateral sides 102L of the cased goods

102 (noting the spatial identifiers front, rear, and lateral sides are with respect to the cased good 102 supported on the infeed conveyor 110 and travelling in the travel direction TD, see FIG. 5—noting other spatial terminology may be used to describe the sides of the cased good 102). One or more of the at least one source of illumination 309, 310 may be disposed on the frame above the infeed conveyor 110 so as to illuminate at least a top side 102T of the cased goods supported on the infeed conveyor and travelling in the travel direction TD. With respect to illumination of a bottom side 102B of the cased goods, a line scan camera 370 is disposed on the frame and includes its own illumination source 370L that illuminates the bottom side 102B through a gap GPR in the infeed conveyor 110 (the gap GPR being substantially similar to the gap GP in FIG. 5).

The at least one source of illumination 301-310 is a white light source or multichromatic light source positioned on the frame 202 relative to the cased goods 102 so as to substantially eliminate specular reflection and the cameras 321-326, 370 are positioned relative to the at least one illumination source 301-310 so as to image and resolve the iconography on the cased goods 102 regardless of any specular reflection that may exist. Here, the at least one source of illumination 301-310 may be configured to illuminate the cased goods 102 with dark-field illumination, bright-field illumination, or a combination of both dark-field and bright-field illumination. In one or more aspects, dark-field illumination is employed at the frontier of the bright-field illumination to substantially avoid specular reflections.

The at least one camera 321-326 is disposed to image the cased goods 102, transported through the frame 202, substantially coincident with the illumination of the cased goods 102. In one or more aspects, the at least one camera 321-326 is disposed to image the cased goods 102, transported through the frame 202, substantially coincident with the flash illumination of the cased goods 102. The at least one camera 321-326, 370 comprises a number of cameras 321-326, 370 disposed so that each plane (e.g., all six sides 102T, 102R, 102F, 102L, 102B) of a hexahedron 102H (e.g., such as all six sides of a cased goods 102) is imaged by a separate and distinct camera 321-326, 370 different than each other camera 321-326, 370, of the number of cameras 321-326, 370, imaging each other plane of the hexahedron. Here, each plane of the hexahedron is imaged by but one (e.g., a single one) of the number of cameras 321-326, 370. As described herein, each of the at least one camera 321-326, 370 has a fixed depth of field.

As an example, the at least one camera 321-326, 370 includes side cameras 324, 325 disposed on the frame 202 so that each of the side cameras 324, 325 image a respective lateral side 102L (see FIG. 5) of the cased goods 102. Each of the side cameras 324, 325 has a fixed depth of field DOFS (see FIG. 3) that is about half the width W of the infeed conveyor 110, although in other aspects the depths of field DOFS may be less than about half the width W of the infeed conveyor 110. In some aspects, there may be some overlap of the depths of field DOFS of the side cameras 324, 325. To maintain a minimized width of the logistics imaging module 200, mirrors 271, 272 are disposed on the frame 202, relative to a respective side camera 324, 325 so that the depth of field DOFS of each side camera 324, 325 is positioned relative to the infeed conveyor 110 in the manner noted above (e.g., the side cameras 324, 325 image the cased goods 102 reflection in the mirror rather than imaging the cased goods directly, where the depth of field of each camera covers about half of the width of the conveyor 110). In other aspects, the side cameras 324, 325 may be disposed on cantilevered supports extending from the frame so as to position the depth of field DOFS as noted above for directly imaging the cased goods 102. The depths of field DOFS are disposed at known locations relative to (e.g., along a length of) the conveyor 110.

The at least one camera 321-326, 370 includes front camera 326 and rear camera 321. The front camera 326 is disposed on the frame so as to image a front 102F of the cased goods 102 (see FIG. 5—relative to the travel direction TD of the cased goods 102) travelling through the frame 202. The rear camera 321 is disposed on the frame so as to image a rear 102R (see FIG. 5) of the cased goods 102 travelling through the frame 202. The front camera 326 has fixed depth of field DOFF and the rear camera 321 has fixed depth of field DOFR (see FIG. 4), where the depths of field DOFF, DOFR are disposed at known locations relative to (e.g., along a length of) the conveyor 110.

Figure 4:
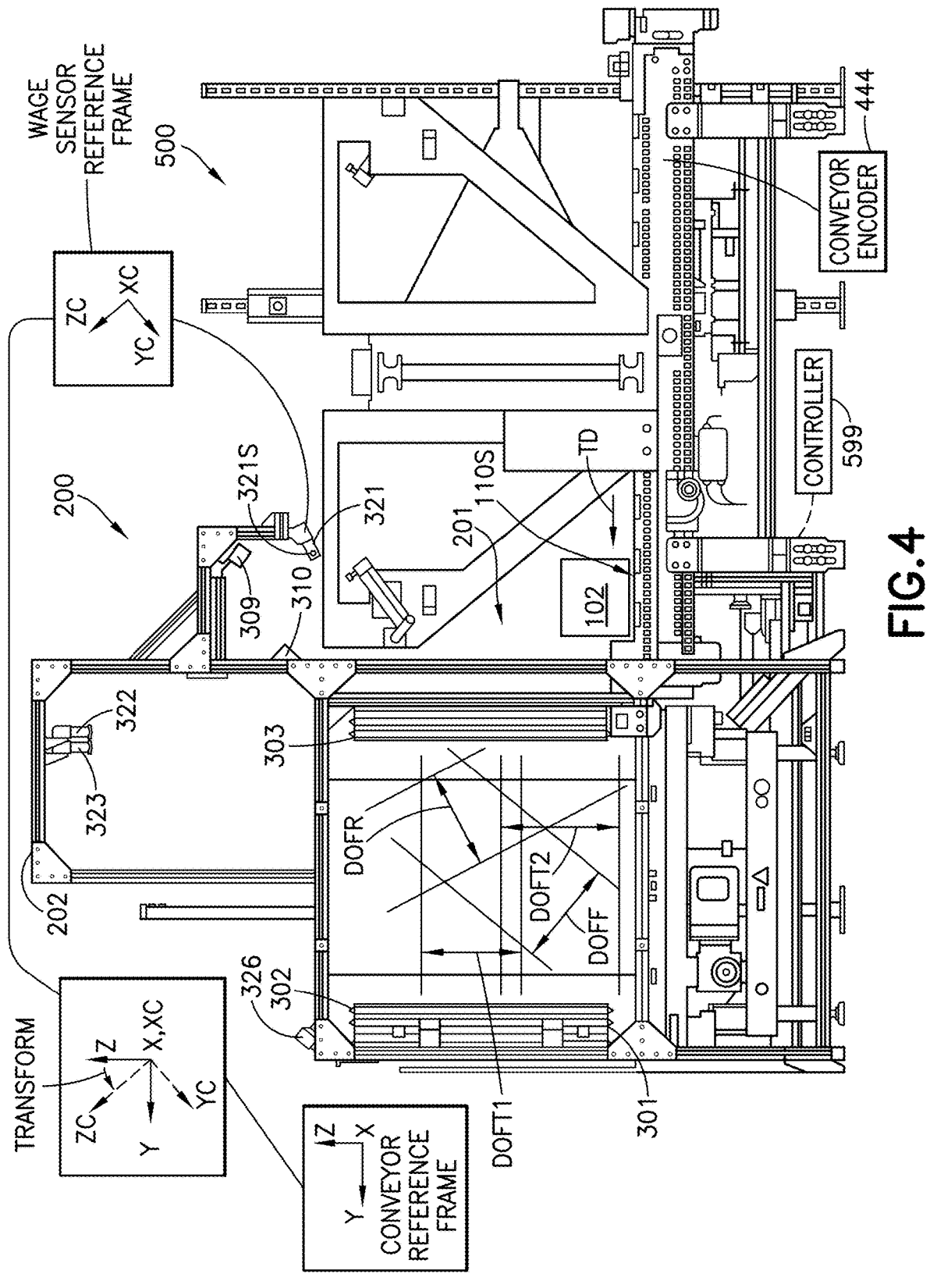
FIG. 4 is a schematic side view illustration of the portion of the logistics facility shown in FIG. 3 in accordance with aspects of the present disclosure.

The at least one camera 321-326, 370 includes two top cameras 322, 323. The top cameras are disposed on the frame 202 so as to image a top 102T (see FIG. 5) of the cased goods 102 travelling through the frame 202. Here, to cover the full range of case sizes of the cased goods 102 each of the top cameras 322, 323 has a depth of field DOFT1, DOFT2 positioned to image a respective elevation range within the tunnel 201 (e.g., formed by the frame 202). For example, top camera 322 has a depth of field DOFT2 that may be referred to as a "far" depth of field relative to depth of field DOFT1. Conversely, top camera 323 has a depth of field DOFT1 that may be referred to as a "close" depth of field relative to depth of field DOFT2. As can be seen in FIG. 4, the depth of field DOFT2 covers an elevation range (e.g., relative to a case support surface of the infeed conveyor 110) that ranges from at or adjacent the case support surface of the infeed conveyor 110 to about half the height of the largest cased goods 102 that travels through the tunnel 201. The depth of field DOFT1 covers an elevation range that ranges from about half the height of the largest cased goods 102 to at or above the height of the largest cased goods 102 so as to image the top 102T of the largest cased goods 102. In some aspects, there may be some vertical overlap between the depths of field DOFT1, DOFT2. The depths of field DOFT1, DOFT2 may be referred to as (vertically) staggered or stacked depths of field. As will be described herein, the top camera 322 with depth of field DOFT2 may be employed by the controller 599 to image tops of cased goods 102 having a height of less than or equal to about 16 inches (about 406 mm), whereas the top camera 323 with depth of field DOFT1 may be employed by the controller 599 to image tops of cased goods 102 having a height of greater than about 16 inches (about 406 mm). The depths of field DOFT1, DOFT2 are disposed at known locations relative to (e.g., along a length of) the conveyor 110.

The line scan camera 370 (see FIG. 3) is disposed on the frame 202 underneath the infeed conveyor 110. The line scan camera 370 is positioned relative to the gap GPR (see FIG. 3) between portions of the infeed conveyor 110 so as to image the bottom 102B of the cased goods 102 as the cased goods travel along the infeed conveyor 110 past and over the gap GPR. As described herein, the line scan camera 370 includes a source of illumination 370L for illuminating the bottom 102B of the cased goods 102 through the gap GPR substantially at the time of imaging with the line scan camera 370. The line scan camera 370 is disposed at a known location relative to (e.g., along a length of) the conveyor 110.

Each of the at least one camera 321-326, 370 has an image sensor 321S-326S, 370S (see FIGS. 1 and 2) that includes a respective reference frame (as an example, see FIG. 4 and reference frame of camera 321, the image sensors of the other cameras have similar reference frames). Referring to camera 321 and image sensor 321S for exemplary purposes only, the image sensor 321S is calibrated with respect to a frame of reference (e.g., reference frame) of the conveyor surface 110S (see FIG. 4) of the infeed conveyor 110 so that a captured image of a face (e.g., in this example, sides 102R) of the cased goods 102, registered by the controller 599 (as described herein), is rectified (e.g., corrected or adjusted by removing errors such as image perspective and distortion caused thereby), via calibration data, to be true (as if the camera was positioned directly in front of the side being imaged) with respect to the reference frame of the image sensor 321S (e.g., independent of distortion effects) for each cased goods 102 independent of a size and location of the iconography on the face/side of the cased goods 102 and independent of size difference between the cased goods 102. It is noted that the conveyor reference frame is defined by the frame 202 such that the conveyor reference frame is common to both the frame 202 and infeed conveyor 110.

Figure 7:
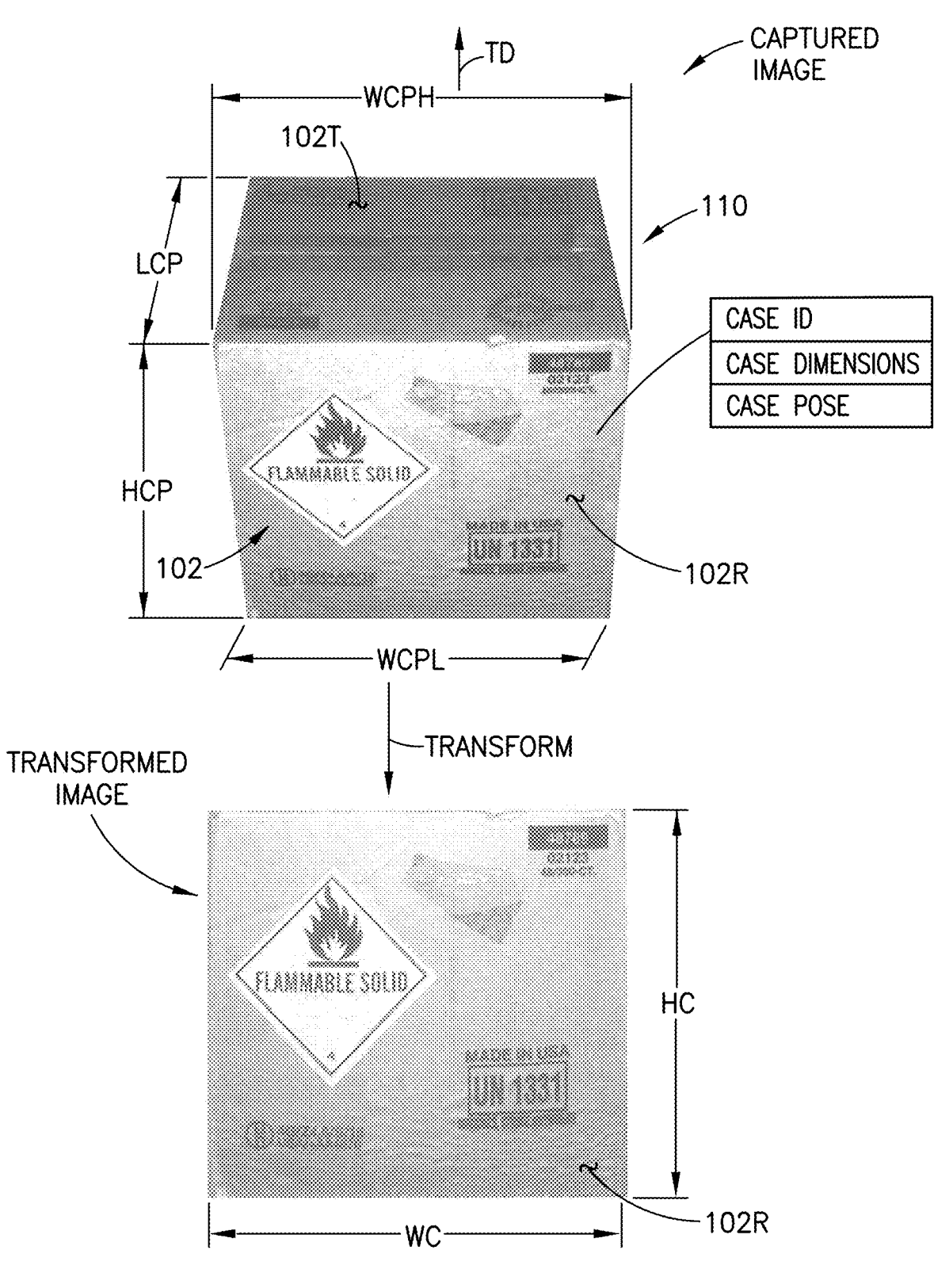
FIG. 7 is an exemplary illustration of an image captured by the logistics imaging module of FIG. 1 and a post processed illustration of that same image, effected by the logistics imaging module of FIG. 1, in accordance with aspects of the present disclosure.
Figure 8:
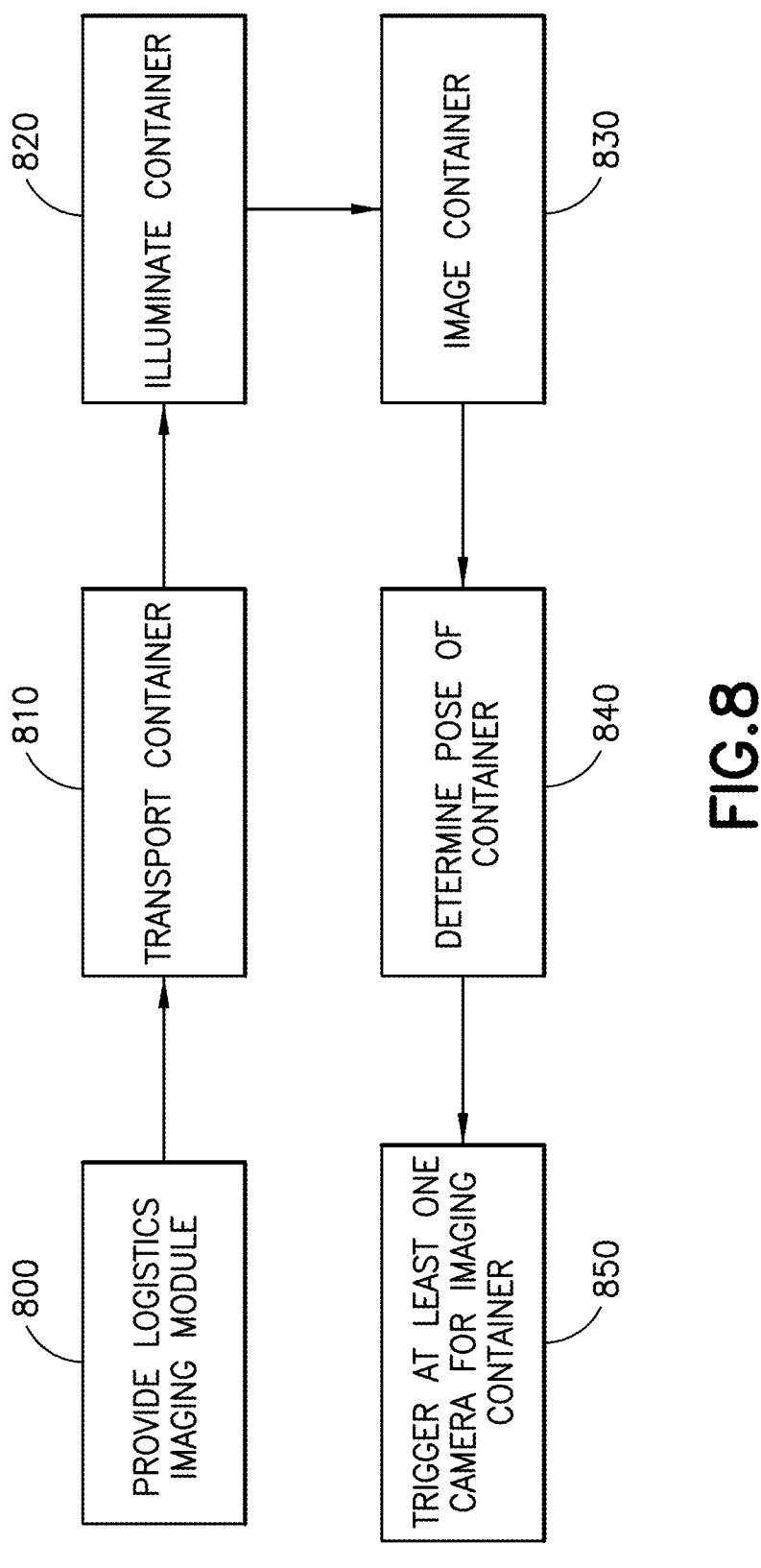
FIG. 8 is an exemplary flow diagram of a method in accordance with aspects of the present disclosure.

The calibration of the image sensor 321S determines a transform (see FIGS. 4 and 7) that rectifies camera images to be aligned with or orthogonal with respect to the reference frame of the image sensor 321S (e.g., any perspective of the cased goods in the captured image is transformed into a true (plan) view image of the side of the cased goods with respect to the image sensor reference frame and any distortion is corrected so that the iconography on the cased goods is presented substantially orthogonal to an image/sensor plane of the camera in the resulting post transformed image—see FIG. 7). The transform also informs or otherwise characterizes an optimum pose or location of the cased goods 102 (the optimum pose or location being optimum for imaging parameters of the camera). The other image sensors 322S-326S, 370S of the other cameras 322-326, 370 are calibrated in a similar manner to determine respective transforms that rectify respective camera images to be true (as described herein) with respect to the reference frame of the respective image sensor 322S-326S, 370S.

Rectification of the image with the transform employs one or more of cased goods dimension data, cased goods pose on the conveyor, and, if desired, cased goods identification data obtained by the case inspection system 500 to remove image perspective and any distortion resulting therefrom. For example, referring to FIG. 7, the case inspection station 500 (FIG. 1) determines at least the dimensions, pose, and identification (e.g., product pre-identification data where this pre-identification data may assist to inform iconography locations on the packaging relative to the packaging dimensions and pose). Here the cased goods is determined to have a length LC, height HC, and width WC. Knowing the case dimensions and pose, the controller 599 is programmed with suitable imaging processing algorithms so as to rectify (e.g., adjust or correct), via the determined transform, the captured image to remove the image perspective so that the perspective width dimensions WCPL, WCPH of the imaged cased goods 102 is rectified to match width WC and the perspective height dimension HCP is rectified to match height HC (noting rectification of perspective length is not necessary in this example given that the rear side 102R is being imaged) so that the side (e.g., side 102R) is presented in the transformed image as being true (e.g., aligned to be parallel with the image plane of the image sensor as if the camera were directly in front of the side 102R) with respect to the image sensor reference frame.

In one or more aspects, the controller 599 is operably connected to the infeed conveyor 110 to transport the cased goods 102 relative to the frame 202. The controller 599 is also communicably connected to the at least one source of illumination 301-310, 370L and the at least one camera 321-326, 370. The controller 599 is configured to trigger the at least one camera 321-236, 370 and the corresponding at least one source of illumination 301-310, 370L so as to image the cased goods 102, transported by the infeed conveyor 110, based on conveyor data locating the cased goods 102 within the frame 202. The controller 599 is configured to trigger the at least one camera 321-326, 370 and the corresponding at least one source of illumination 301-310, 370L based on determining the location of the cased goods 102 being optimum for imaging parameters (e.g., at least the location of the depth of field) of the camera. The controller 599 is configured to determine the optimum location based on conveyor encoder data (e.g., obtained by the controller 599 from the conveyor encoder 444) and based on cased goods 102 characteristics identifying at least a size and pose of the container (as described herein and obtained from the case inspection system 500). The conveyor encoder data identifies the location of the cased goods 102 within in the frame 202 along a length of the infeed conveyor 110.

In one or more aspects, the controller 599 is operably connected to the infeed conveyor 110 to determine a pose of the cased goods 102, transported thereon, relative to the frame 202. The controller 599 is communicably connected to the at least one source of illumination 301-310, 370L and the at least camera 321-326, 370. The controller 499 is configured to trigger the at least one camera 321-326, 370 and the corresponding at least one source of illumination 301-310, 370L so as to image the cased goods 102, transported by the infeed conveyor 110, based on the determined pose being an optimum pose for imaging parameters of the at least one camera 321-326, 370 (e.g., the side of the cased goods 102 being imaged falls within the depth of field of the camera capturing the image). The controller 599 is configured to determine the optimum pose based on conveyor encoder data (e.g., obtained by the controller 599 from the conveyor encoder 444) identifying a location of the cased goods 102 in the frame 202, and based on cased goods 102 characteristics identifying at least a size and pose of the cased goods 102 (as described herein and obtained from the case inspection system 500).

The controller 599 is configured to register, such as in memory 599M, a cased goods image (e.g., such as illustrated in FIG. 7) captured by the at least one camera 321-326, 370 of the cased goods 120 transported on the infeed conveyor 110. The controller 599 is configured to resolve and identify each iconography on a face of the imaged cased goods 102 from the registered container image of a common camera, of the at least one camera 321-326, 370 (e.g., the registered container image is captured by a single one of the at least one camera 321-326, 370—noting that more than one camera may be triggered to effect registration of separate respective images of respective case sides such as where iconography is located on more than one side of the cased goods 102). The imaged registered may be the transformed image of FIG. 7; however, in other aspects the captured (raw or untransformed) image may also be registered.

The controller 599 is configured to trigger the at least one camera 321-326, 370 and the corresponding at least one source of illumination 301-310, 370L so as to image each cased goods 102 transported by the infeed conveyor 110 through the frame 202, and to resolve and identify each iconography (independent of a size of the iconography where the iconography has different sizes) on the face of each imaged cased goods 102 independent of size difference between each cased goods 102 and each other cased goods 102 transported through the frame 202 at the predetermined continuous throughout rate 110R. For example, the at least one camera 321-326, 370 and the respective depths of field DIFF, DOFR, DOFS, DOT1, DOT2 (and the depth of field of the line scan camera 370) are arranged such that all sizes of cased goods expected to pass through the frame 202 are in focus with respect to the camera capturing the image. The at least one camera 321-326, 370 is disposed to, and the controller 599 is configured to, resolve and identify each iconography of the imaged cased goods 102 independent of location and size of the iconography on faces (e.g., sides) of the imaged cased goods 102.

Figure 10:
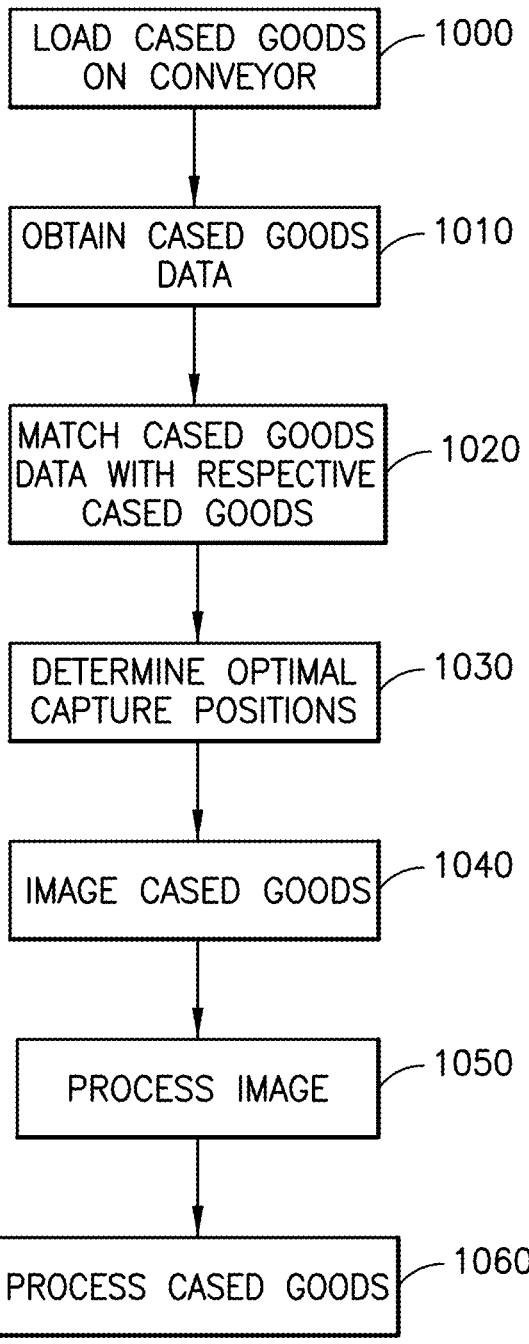
FIG. 10 is an exemplary flow diagram of a method in accordance with aspects of the present disclosure.

Referring to FIGS. 1-4 and 6 an exemplary operation of the logistics imaging module 200 will be described. Cased goods are placed on the infeed conveyor 110 from unloading of a truck at the truck load dock 121 or from the unloading of a pallet at the depalletizer 122 (FIG. 10, Block 1000). The cased goods 102 are transported through the case inspection system 500 for a determination of cased goods data (FIG. 10, Block 1010). For example, the dimensions and other information (such as described herein) of the cased goods 102 are obtained by the cased goods inspection system 500 and the resulting case information 620 is communicated to a programmable logic controller 610. The programmable logic controller 610 may be part of a logistics facility 190 controller that includes a listing of cased goods and respective attributes (stored in a suitable table registered in a suitable memory, where the attributes include at least case dimensions, iconography included on the case, and sides of the case on which the iconography is located). In other aspects, iconography is automatically located and decoded by the logistics imaging module 200 and/or a controller 599, 610, where the case dimensions and pose are communicated from the cased goods inspection system 500 to the logistics imaging module 200 for image transformation of each of the cased goods faces. Based on the resulting case information 620 from the case inspection system 500, the programmable logic controller 610 identifies, from the listing of cased goods, a case identification 621 that informs or otherwise characterizes the iconography and locations of the iconography for the inspected cased goods 102M; where in other aspects, as noted above, the localization and decoding/characterization of the iconography is effected with the logistics imaging module 200. The programmable logic controller 610 communicates the case identification 621 to the case inspection system 500 and the case inspection system 500 communicates box information 622 (inclusive of the cased goods dimensions and identification) to the controller 599 of the logistics imaging module 200. Here, the controller 599 may include an industrial PC or other computing device/processor 599PC that receives the box information 622 and is configured for imaging processing of the captured image.

The box information 622 is associated or matched with the respective cased goods 102 from the box information was generated (FIG. 10, Block 1020). For example, the cased goods 102 are spaced along the infeed conveyor 110 one after another such that the box information 622 is generated and associated with the cased goods from which the box information 622 was generated. Here, the logistics imaging module 200 includes a photocell 600 disposed at an entrance to the tunnel 201 (the tunnel being formed by the frame 202). The logistics imaging module 200, via the controller 599, employs conveyor encoder 444 data and the photocell 600 to detect the cased goods 102 entering the logistics imaging module 200 from the case inspection station 500 and to associate the box information 622 with the respective cased goods 102. This box information 622, as described herein, sent to and is employed by the controller 599 for triggering the at least one camera 321-326, 370 and the at least one light source 301-310 so as to image a side of the cased goods 102 on which the iconography is disposed (with the side being positioned within the triggered camera's depth of field).

With the cased goods 102 entering the tunnel 201, the controller 599 determines the optimal image capture position(s) of the cased goods 102 (FIG. 10, Block 1030). For example, the position of the cased goods 102 along the length of the frame 202 in the travel direction TD is known to the controller 599 based on detection of the cased goods 102 by the photocell 600 and the conveyor encoder 444 data. One or more cased goods characteristics (e.g., one or more of case pose, dimensions, iconography locations, etc.) are also known to the controller 599 from the box information 622; while in one or more aspects, the location and size of the iconography are not included (e.g., unknown) in the box information 622 and are determined by the logistics imaging module 200. It is also noted that the at least one camera 321-326, 370 are in known locations on the frame 202 and, as described herein, have been calibrated with respect to the conveyor 110 (and frame 202) so that the location of the depths of field DOFS, DOFR, DOFF, DOFT1, DOFT2 (the depth of field of the line scan camera 370 being known based on the conveyor surface 110S location) are known with respect to the conveyor 110. Based on the box information 622 the controller 599 determines which of the at least one camera 321-326, 370 is to image the cased goods, and knowing which camera is to image the cased goods 102 the controller 599 determines the location on the conveyor 110 (e.g., in the travel direction TD) in which the cased goods is to be located for imaging by the determined camera(s).

As a simplified example of camera and optimal capture position determination, referring also to FIG. 7, the cased goods 102 is travelling along the infeed conveyor 110 in travel direction TD. The box information 622 specifies that the cased goods has a pose on the infeed conveyor 110 such that the cased goods 102 is biased towards the side S1 (see FIG. 3), has a length LC, a width WC, and a height HC (and in aspects where iconography location is included in the box information 622, the box information specifies that iconography to be imaged (in this example hazmat iconography) is located on the rear side 102R of the cased goods 102— otherwise the location of the iconography is unknown as an input to the controller 599). Where the iconography location is provided in the box information 622, the controller 599 determines from the box information 622 that the rear side 102R of the cased goods 102 is to be illuminated and imaged for capturing an image of the iconography. As the rear camera 321 is selected for imaging the controller 599 also determines that at least one sources of illumination 303-306 are to be employed for illuminating the rear side 102R of the cased goods 102 for imaging. Where the iconography is not included in the box information 622, the controller 599 triggers the line scan camera 370 and at least five of the 321-326 (where the top camera(s) 322, 323 are selected as noted herein), and the corresponding at least one sources of illumination 303-306. In some aspects, some of the cameras 321-326, 370 and the corresponding at least one sources of illumination 303-306 may be triggered more than one for imaging the same case (e.g., one camera may take more than one image of a single side of the case).

The controller 599 locates the cased goods 102 within the frame through detection of a leading edge (with respect to the travel direction TD) of the cased goods 102 and based on the pose information and cased goods dimensions (e.g., provided in the box information 622) the controller 599 determines the location and orientation of each of the six sides of the cased goods with respect to the conveyor 110. The controller 599 employs the conveyor encoder 444 data to determine a position of the cased goods 102 on the conveyor 110 so that the rear side 102R of the cased goods 102 is within the depth of field DOFR of the rear camera 321. In the example illustrated, the rear side 102R is substantially orthogonal to the travel direction TD; however, in other examples the rear side may be skewed at an angle relative to the travel direction TD (the angle being known from the box information 622). The controller 599 may include a real-time (e.g., data is processed to provide a near instantaneous output) controller 599RT to which the processor 599PC communicates the determined position of the cased goods 102 (in other aspects the real-time controller 599RT may be integral with the processor 599PC). When the cased goods 102 reaches the determined position on the infeed conveyor 110, the real-time controller 599RT illuminates the rear side 102R with at least one or more of sources of illumination 303-306 and triggers the rear camera 321 substantially coincident with the illumination for imaging the rear side 102R of the cased goods 102 (FIG. 10, Block 1040). While, in this example, iconography is present only on the rear side 102R of the cased goods, in other examples iconography may be present on more than one side such that images of each side the iconography is present is captured by a respective camera with the side being imaged disposed within the depth of field of the respective camera and where each side is imaged with but one (e.g., a single) respective camera.

With capture of the image, the real-time controller 599RT communicates an image capture notification to the processor 599PC that an image was captured. The image capture notification may provide information (e.g., metadata) to the processor 599PC indicating which camera captured the image, the cased goods for which the image was captured, and/or any other suitable information that effects matching the captured image with the respective cased goods 102. The processor 599PC receives the captured imaged (e.g., identified by the image capture notification and processes the captured image as described herein (FIG. 10, Block 1050). For example, the processor 599PC corrects the geometry of the image so as to remove perspective and distortion as described herein with respect to FIG. 7 then it identifies or otherwise resolves iconography (such as barcodes 180 and (hazmat+Arrow) symbologies). As described herein, the perspective and distortion removal is effected by the box information 622 provided by the case inspection station 500 and the calibration of the at least one camera 321-326, 370 and results in an image showing the side of the cased goods as if the camera were directly in front of the side being imaged and analyzed. With the image corrected, the processor 599PC identifies the iconography in the corrected image, noting that the raw image and the corrected image provides resolution for reading 10 MIL bar codes, while in other aspects smaller and bigger bar codes may be read. With the iconography identified, read, and associated with the respective cased goods 102, the processor 599PC communicates the iconography detection results to the programmable logic controller 610 so that the cased goods 102 are processed within the automated storage array 190AS in accordance with the iconography detection results (FIG. 10, Block 1060). In one or more aspects, where the determined iconography (or lack thereof) does not match what is expected for the identified cased goods 102, the programmable logic controller 610 may identify the cased goods 102 are defective (e.g., a non-limiting example of a defective cased good is one that includes a hazmat symbol on any face and also has a directional arrow on any of the faces that is not oriented properly (i.e., the arrow is not facing up)) and divert the cased goods 102 from the infeed conveyor 110 (in any suitable manner) for operator inspection and correction.

Figure 9:
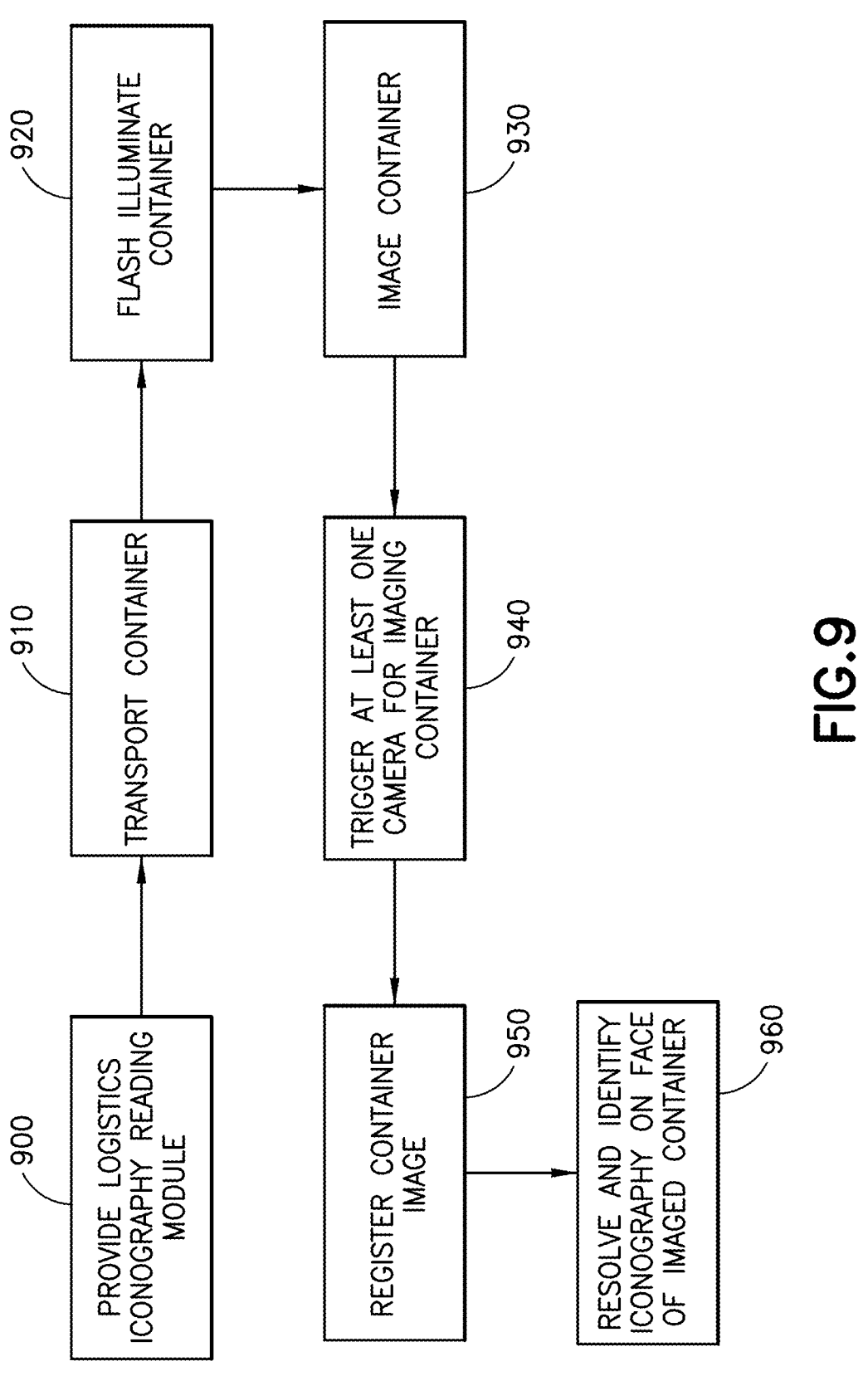
FIG. 9 is an exemplary flow diagram of a method in accordance with aspects of the present disclosure.

Referring to FIGS. 1-4 and 8 an exemplary method for reading logistic iconography on containers of goods (e.g., cased goods) of different sizes will be described. The method includes providing a logistics imaging module 200 (FIG. 8, Block 800) having a frame 202, a conveyor 110 coupled to the frame 202, at least one source of illumination 301-310 connected to the frame 202, and at least one camera 321-326, 370. Each cased goods or container 102 is transported (FIG. 8, Block 810), by the conveyor 110, through the frame 202 at the predetermined continuous throughput rate 110R. The cased goods 102 transported through the frame 202 is illuminated (FIG. 9, Block 820), with the at least one source of illumination 301-310, with diffuse light. The cased goods 102 transported through the frame 202 is imaged (FIG. 9, Block 830), with the at least one camera 321-326, 370, substantially coincident with the illumination of the cased goods 102, where the at least one camera 321-326, 370 has a fixed depth of field DOFF, DOFR, DOFS, DOFT1, DOFT2. A pose of the cased goods 102 transported relative to the frame 202 is determined (FIG. 8, Block 840), with the controller 599 operably connected to the conveyor 110, where the controller 110 is communicably connected to the at least one source of illumination 301-310 and the at least one camera 321-326, 370. The controller 599 triggers the at least one camera 31-326, 370 (FIG. 8, Block 850) imaging the cased goods 102, transported through the frame, based on the determined pose being an optimum pose for imaging parameters of the at least one camera 321-326, 370.

Referring to FIGS. 1-4 and 9 an exemplary method for reading logistic iconography on containers of goods (e.g., cased goods) of different sizes will be described. The method includes providing a logistics iconography reading module 200 (FIG. 9, Block 900) having a frame 202, a conveyor 110 coupled to the frame 110, at least one source of illumination 301-310 connected to the frame, and at least one camera 321-326, 370. Each cased goods 102 is transported (FIG. 9, Block 910), with the conveyor 110, through the frame at the predetermined continuous throughput rate 110R. The cased goods 102 transported through the frame 202 is flash illuminated (FIG. 9, Block 920), with the at least one source of illumination 301-310, with diffuse light. The cased goods 102 transported through the frame 202 is imaged (FIG. 9, Block 930), with the at least one camera 321-326, 370, substantially coincident with the flash illumination of the cased goods 102, where the at least one camera 321-326, 370 has a fixed depth of field DOFF, DOFR, DOFS, DOFT1, DOFT2. The controller 599 triggers the at least one camera 321-326, 370 (FIG. 9 Block 940) imaging the cased goods 102 transported through the frame 202. The at least one camera 321-326, 370 is triggered based on conveyor data (such as described herein) locating the cased goods 102 in the frame 202. The controller 599 is operably connected to the conveyor 110 to transport the container relative to the frame, and communicably connected to the at least one source of illumination 301-310 and the at least one camera 321-326, 370. The controller 599 registers the cased goods image (e.g., the captured image) (FIG. 9, Block 950), captured by the at least one camera 321-326, 370, of the cased goods 102 transported through the frame 202. The controller 599 resolves and identifies each iconography on a face of the imaged cased goods (FIG. 9, Block 960) from the registered container image of a common camera, of the at least one camera 321-326, 370 (as described herein).

As can be seen from the above, the aspects of the present disclosure provide for a logistics imaging module 200 that supports reading of both barcode and hazmat iconography in a common tunnel 201 and employs fewer cameras than conventional barcode reading systems. The logistics imaging module 200 may also have a footprint such that the logistics imaging module has a length equivalent to about one conveyor section length (e.g., about 52 inches (about 1328 mm) in length). The size and reduced number of components in the logistics imaging module 200 provides for a lower cost and lower complexity system than that of convention system (such as those described above).

In accordance with one or more aspects of the present disclosure, a logistics imaging module, for reading logistic iconography on containers of goods of different sizes, comprises: a frame; a conveyor coupled to the frame to transport each container through the frame at a predetermined continuous throughput rate; at least one source of illumination connected to the frame and configured to illuminate the container, transported through the frame, with diffuse light; at least one camera disposed to image the container transported substantially coincident with the illumination of the container, where the at least one camera has a fixed depth of field; and a controller operably connected to the conveyor to determine a pose of the container transported relative to the frame, the controller is communicably connected to the at least one source of illumination and the at least one camera, where the controller is configured to trigger the at least one camera imaging the container transported based on the determined pose being an optimum pose for imaging parameters of the at least one camera.

In accordance with one or more aspects of the present disclosure, the controller is configured to determine the optimum pose based on conveyor encoder data identifying a location of the container in the frame, and based on container characteristics identifying a size of the container.

In accordance with one or more aspects of the present disclosure the controller is configured to register a container image captured by the at least one camera of the container transported, and to resolve and identify each iconography on a face of the imaged container from the registered container image of a common camera, of the at least one camera.

In accordance with one or more aspects of the present disclosure, the controller is configured to trigger the at least one camera so as to image each container transported through the frame, and to resolve and identify each iconography on a face of each imaged container independent of a size and location of the iconography on the face and independent of size difference between each container and each other container transported through the frame at the predetermined continuous throughput rate.

In accordance with one or more aspects of the present disclosure, the predetermined continuous throughput rate is commensurate with a predetermined input rate of a logistic facility corresponding to a conveyor steady state speed of about 2 ft/sec.

In accordance with one or more aspects of the present disclosure, the at least one camera is disposed to, and the controller is configured to, resolve and identify each iconography on the imaged container independent of location of the iconography on faces of the imaged container.

In accordance with one or more aspects of the present disclosure, the at least one camera comprises a number of cameras disposed so that each plane of a hexahedron is imaged by a separate distinct camera different than each other camera, of the number of cameras, imaging each other plane of the hexahedron.

In accordance with one or more aspects of the present disclosure, each plane is imaged by but one camera of the number of cameras.

In accordance with one or more aspects of the present disclosure, the iconography includes at least one of a bar code, a hazard graphic symbol, and an up direction arrow symbol.

In accordance with one or more aspects of the present disclosure, the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

In accordance with one or more aspects of the present disclosure, camera calibration determines a transform that rectifies camera images to be true with respect to the reference frame of the image sensor and characterizes the optimum pose of the container.

In accordance with one or more aspects of the present disclosure, the at least one source of illumination is a white or multichromatic light source.

In accordance with one or more aspects of the present disclosure, the conveyor is an infeed conveyor for an automated storage array, and the predetermined continuous throughput rate matches a throughput rate of at least another downstream automation component loading containers fed by the conveyor into storage locations of the automated storage array.

In accordance with one or more aspects of the present disclosure, a logistics iconography reading module, for reading logistic iconography on containers of goods of different sizes, comprises: a frame; a conveyor coupled to the frame to transport each container through the frame at a predetermined continuous throughput rate; at least one source of illumination connected to the frame and configured to flash illuminate the container, transported through the frame, with diffuse light; at least one camera disposed to image the container transported substantially coincident with the flash illumination of the container, where the at least one camera has a fixed depth of field; and a controller operably connected to the conveyor to transport the container relative to the frame, and communicably connected to the at least one source of illumination and the at least one camera, where the controller is configured to trigger the at least one camera and the at least one source of illumination so as to image the container transported based on conveyor data locating the container in the frame; wherein the controller is configured to register a container image captured by the at least one camera of the container transported, and to resolve and identify each iconography on a face of the imaged container from the registered container image of a common camera, of the at least one camera.

In accordance with one or more aspects of the present disclosure the controller is configured to trigger the at least one camera based on determining the location of the container being optimum for imaging parameters of the camera.

In accordance with one or more aspects of the present disclosure, the controller is configured to determine the optimum location based on conveyor encoder data identifying the location of the container in the frame, and based on container characteristics identifying a size of the container.

In accordance with one or more aspects of the present disclosure, the controller is configured to trigger the at least one camera so as to image each container transported through the frame, and to resolve and identify each iconography on a face of each imaged container independent of a size and location of the iconography on the face and independent of size difference between each container and each other container transported through the frame at the predetermined continuous throughput rate.

In accordance with one or more aspects of the present disclosure, the predetermined continuous throughput rate is commensurate with a predetermined input rate of a logistic facility corresponding to a conveyor steady state speed of about 2 ft/sec.

In accordance with one or more aspects of the present disclosure, the at least one camera is disposed to, and the controller is configured to, resolve and identify each iconography on the imaged container independent of location of the iconography on faces of the imaged container.

In accordance with one or more aspects of the present disclosure, the at least one camera comprises a number of cameras disposed so that each plane of a hexahedron is imaged by a separate distinct camera different than each other camera, of the number of cameras, imaging each other plane of the hexahedron.

In accordance with one or more aspects of the present disclosure, each plane is imaged by but one camera of the number of cameras.

In accordance with one or more aspects of the present disclosure, the iconography includes at least one of a bar code, a hazard graphic symbol, and an up direction arrow symbol.

In accordance with one or more aspects of the present disclosure, the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

In accordance with one or more aspects of the present disclosure, camera calibration determines a transform that rectifies camera images to be true with respect to the reference frame of the image sensor and characterizes an optimum location of the container.

In accordance with one or more aspects of the present disclosure, the at least one source of illumination is a white or multichromatic light source.

In accordance with one or more aspects of the present disclosure, the conveyor is an infeed conveyor for an automated storage array, and the predetermined continuous throughput rate matches a throughput rate of at least another downstream automation component loading containers fed by the conveyor into storage locations of the automated storage array.

In accordance with one or more aspects of the present disclosure, a method for reading logistic iconography on containers of goods of different sizes is provided. The method comprises: providing logistics imaging module having a frame, a conveyor coupled to the frame, at least one source of illumination connected to the frame, and at least one camera; transporting, with the conveyor, each container through the frame at a predetermined continuous throughput rate; illuminating, with the at least one source of illumination, the container, transported through the frame, with diffuse light; imaging, with the at least one camera, the container transported substantially coincident with the illumination of the container, where the at least one camera has a fixed depth of field; determining, with a controller operably connected to the conveyor, a pose of the container transported relative to the frame, where the controller is communicably connected to the at least one source of illumination and the at least one camera; and triggering, with the controller, the at least one camera imaging the container transported based on the determined pose being an optimum pose for imaging parameters of the at least one camera.

In accordance with one or more aspects of the present disclosure, the method further comprises determining, with the controller, the optimum pose based on conveyor encoder data identifying a location of the container in the frame, and based on container characteristics identifying a size of the container.

In accordance with one or more aspects of the present disclosure, the method further comprises, with the controller: registering a container image captured by the at least one camera of the container transported; and resolving and identifying each iconography on a face of the imaged container from the registered container image of a common camera, of the at least one camera.

In accordance with one or more aspects of the present disclosure, the method further comprises, with the controller: triggering the at least one camera so as to image each container transported through the frame; and resolving and identifying each iconography on a face of each imaged container independent of a size and location of the iconography on the face and independent of size difference between each container and each other container transported through the frame at the predetermined continuous throughput rate.

In accordance with one or more aspects of the present disclosure, the predetermined continuous throughput rate is commensurate with a predetermined input rate of a logistic facility corresponding to a conveyor steady state speed of about 2 ft/sec.

In accordance with one or more aspects of the present disclosure, the at least one camera is disposed to, and the controller is configured to, resolve and identify each iconography on the imaged container independent of location of the iconography on faces of the imaged container.

In accordance with one or more aspects of the present disclosure, the at least one camera comprises a number of cameras disposed so that each plane of a hexahedron is imaged by a separate distinct camera different than each other camera, of the number of cameras, imaging each other plane of the hexahedron.

In accordance with one or more aspects of the present disclosure, each plane is imaged by but one camera of the number of cameras.

In accordance with one or more aspects of the present disclosure, the iconography includes at least one of a bar code, a hazard graphic symbol, and an up direction arrow symbol.

In accordance with one or more aspects of the present disclosure, the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

In accordance with one or more aspects of the present disclosure, camera calibration determines a transform that rectifies camera images to be true with respect to the reference frame of the image sensor and characterizes the optimum pose of the container.

In accordance with one or more aspects of the present disclosure, the at least one source of illumination is a white or multichromatic light source.

In accordance with one or more aspects of the present disclosure, the conveyor is an infeed conveyor for an automated storage array, and the predetermined continuous throughput rate matches a throughput rate of at least another downstream automation component loading containers fed by the conveyor into storage locations of the automated storage array.

In accordance with one or more aspects of the present disclosure, a method for reading logistic iconography on containers of goods of different sizes is provided. The method comprises: providing a logistics iconography reading module having a frame, a conveyor coupled to the frame, at least one source of illumination connected to the frame, and at least one camera; transporting, with the conveyor, each container through the frame at a predetermined continuous throughput rate; flash illuminating, with the at least one source of illumination, the container, transported through the frame, with diffuse light; imaging, with the at least one camera, the container transported substantially coincident with the flash illumination of the container, where the at least one camera has a fixed depth of field; triggering, with a controller, the at least one camera imaging the container transported based on conveyor data locating the container in the frame, where the controller is operably connected to the conveyor to transport the container relative to the frame, and communicably connected to the at least one source of illumination and the at least one camera; registering, with the controller, a container image captured by the at least one camera of the container transported; and resolving and identifying, with the controller, each iconography on a face of the imaged container from the registered container image of a common camera, of the at least one camera.

In accordance with one or more aspects of the present disclosure, the method further comprises, with the controller, triggering the at least one camera based on determining the location of the container being optimum for imaging parameters of the camera.

In accordance with one or more aspects of the present disclosure, the method further comprises, with the controller, determining the optimum location based on conveyor encoder data identifying the location of the container in the frame, and based on container characteristics identifying a size of the container.

In accordance with one or more aspects of the present disclosure, the method further comprises, with the controller: triggering the at least one camera so as to image each container transported through the frame; and resolving and identifying each iconography on a face of each imaged container independent of a size and location of the iconography on the face and independent of size difference between each container and each other container transported through the frame at the predetermined continuous throughput rate.

In accordance with one or more aspects of the present disclosure, the predetermined continuous throughput rate is commensurate with a predetermined input rate of a logistic facility corresponding to a conveyor steady state speed of about 2 ft/sec.

In accordance with one or more aspects of the present disclosure, the at least one camera is disposed to, and the controller is configured to, resolve and identify each iconography on the imaged container independent of location of the iconography on faces of the imaged container.

In accordance with one or more aspects of the present disclosure, the at least one camera comprises a number of cameras disposed so that each plane of a hexahedron is imaged by a separate distinct camera different than each other camera, of the number of cameras, imaging each other plane of the hexahedron.

In accordance with one or more aspects of the present disclosure, each plane is imaged by but one camera of the number of cameras.

In accordance with one or more aspects of the present disclosure, the iconography includes at least one of a bar code, a hazard graphic symbol, and an up direction arrow symbol.

In accordance with one or more aspects of the present disclosure, the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

In accordance with one or more aspects of the present disclosure, camera calibration determines a transform that rectifies camera images to be true with respect to the reference frame of the image sensor and characterizes an optimum location of the container.

In accordance with one or more aspects of the present disclosure the at least one source of illumination is a white or multichromatic light source.

In accordance with one or more aspects of the present disclosure, the conveyor is an infeed conveyor for an automated storage array, and the predetermined continuous throughput rate matches a throughput rate of at least another downstream automation component loading containers fed by the conveyor into storage locations of the automated storage array.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A logistics imaging module for reading logistic iconography on containers of goods of different sizes, the logistics imaging module comprising:
   a frame;
   a conveyor coupled to the frame to transport each container through the frame at a predetermined continuous throughput rate;
   at least one source of illumination connected to the frame and configured to illuminate the container, transported through the frame, with diffuse light;
   at least one camera disposed to image the container transported substantially coincident with the illumination of the container, where the at least one camera has a fixed depth of field; and
   a controller operably connected to the conveyor to determine a pose of the container transported relative to the frame coupled to the conveyor, the controller is communicably connected to the at least one source of illumination and the at least one camera, where the controller is configured to trigger the at least one camera and the at least one source of illumination so as to image the container transported based on the determined pose being an optimum pose for imaging parameters of the at least one camera.

2. The logistics imaging module of claim 1, wherein the controller is configured to determine the optimum pose based on conveyor encoder data identifying a location of the container in the frame, and based on container characteristics identifying a size of the container.

3. The logistics imaging module of claim 1, wherein the controller is configured to register a container image captured by the at least one camera of the container transported, and to resolve and identify each iconography on a face of the imaged container from the registered container image of a common camera, of the at least one camera.

4. The logistics imaging module of claim 1, wherein the controller is configured to trigger the at least one camera and the at least one source of illumination so as to image each container transported through the frame, and to resolve and identify each iconography on a face of each imaged container independent of a size and location of the iconography on the face and independent of size difference between each container and each other container transported through the frame at the predetermined continuous throughput rate.

5. The logistics imaging module of claim 1, wherein the predetermined continuous throughput rate is commensurate with a predetermined input rate of a logistic facility corresponding to a conveyor steady state speed of about 2 ft/sec.

6. The logistics imaging module of claim 1, wherein the at least one camera is disposed to, and the controller is configured to, resolve and identify each iconography on the imaged container independent of location of the iconography on faces of the imaged container.

7. The logistics imaging module of claim 1, wherein the at least one camera comprises a number of cameras disposed so that each plane of a hexahedron is imaged by a separate distinct camera different than each other camera, of the number of cameras, imaging each other plane of the hexahedron.

8. The logistics imaging module of claim 7, wherein each plane is imaged by but one camera of the number of cameras.

9. The logistics imaging module of claim 1, wherein the iconography includes at least one of a bar code, a hazard graphic symbol, and an up direction arrow symbol.

10. The logistics imaging module of claim 1, wherein the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

11. The logistics imaging module of claim 10, wherein camera calibration determines a transform that rectifies camera images to be true with respect to the reference frame of the image sensor and characterizes the optimum pose of the container.

12. The logistics imaging module of claim 1, wherein the at least one source of illumination is a white or multichromatic light source.

13. The logistics imaging module of claim 1, wherein the conveyor is an infeed conveyor for an automated storage array, and the predetermined continuous throughput rate matches a throughput rate of at least another downstream automation component loading containers fed by the conveyor into storage locations of the automated storage array.

14. A logistics iconography reading module for reading logistic iconography on containers of goods of different sizes, the logistics iconography reading module comprising:
   a frame;
   a conveyor coupled to the frame to transport each container through the frame at a predetermined continuous throughput rate;
   at least one source of illumination connected to the frame and configured to flash illuminate the container, transported through the frame, with diffuse light;
   at least one camera disposed to image the container transported substantially coincident with the flash illumination of the container, where the at least one camera has a fixed depth of field; and
   a controller operably connected to the conveyor to transport the container relative to the frame coupled to the conveyor, and communicably connected to the at least one source of illumination and the at least one camera, where the controller is configured to trigger the at least one camera and the at least one source of illumination so as to image the container transported based on conveyor data locating the container in the frame;
   wherein the controller is configured to register a container image captured by the at least one camera of the container transported, and to resolve and identify each iconography on a face of the imaged container from the registered container image of a common camera, of the at least one camera.

15. The logistics iconography reading module of claim 14, wherein the controller is configured to trigger the at least one camera and the at least one source of illumination based on determining the location of the container being optimum for imaging parameters of the camera.

16. The logistics iconography reading module of claim 15, wherein the controller is configured to determine the optimum location based on conveyor encoder data identifying the location of the container in the frame, and based on container characteristics identifying a size of the container.

17. The logistics iconography reading module of claim 14, wherein the controller is configured to trigger the at least one camera and the at least one source of illumination so as to image each container transported through the frame, and to resolve and identify each iconography on a face of each imaged container independent of a size and location of the iconography on the face and independent of size difference between each container and each other container transported through the frame at the predetermined continuous throughput rate.

18. The logistics iconography reading module of claim 14, wherein the predetermined continuous throughput rate is commensurate with a predetermined input rate of a logistic facility corresponding to a conveyor steady state speed of about 2 ft/sec.

19. The logistics iconography reading module of claim 14, wherein the at least one camera is disposed to, and the controller is configured to, resolve and identify each iconography on the imaged container independent of location of the iconography on faces of the imaged container.

20. The logistics iconography reading module of claim 14, wherein the at least one camera comprises a number of cameras disposed so that each plane of a hexahedron is imaged by a separate distinct camera different than each other camera, of the number of cameras, imaging each other plane of the hexahedron.

21. The logistics iconography reading module of claim 20, wherein each plane is imaged by but one camera of the number of cameras.

22. The logistics iconography reading module of claim 14, wherein the iconography includes at least one of a bar code, a hazard graphic symbol, and an up direction arrow symbol.

23. The logistics iconography reading module of claim 14, wherein the at least one camera has an image sensor that is calibrated with respect to a frame of reference of a conveyor surface of the conveyor so that a captured image of a face of the container, registered by the controller, is rectified, via calibration data, to be true with respect to a reference frame of the image sensor for each container independent of size difference.

24. The logistics iconography reading module of claim 23, wherein camera calibration determines a transform that rectifies camera images to be true with respect to the reference frame of the image sensor and characterizes an optimum location of the container.

25. The logistics iconography reading module of claim 14, wherein the at least one source of illumination is a white or multichromatic light source.

26. The logistics iconography reading module of claim 14, wherein the conveyor is an infeed conveyor for an automated storage array, and the predetermined continuous throughput rate matches a throughput rate of at least another downstream automation component loading containers fed by the conveyor into storage locations of the automated storage array.

* * * * *